(12) United States Patent
Kirschke et al.

(10) Patent No.: US 11,888,298 B2
(45) Date of Patent: Jan. 30, 2024

(54) CABLE GUIDE AND DEVICE

(71) Applicant: Wincor Nixdorf International GmbH, Paderborn (DE)

(72) Inventors: Uwe Kirschke, Berlin (DE); Andreas Jeschke, Dallgow (DE); Jörg Schmidt, Meuselwitz (DE)

(73) Assignee: Diebold Nixdorf Systems GmbH, Paderborn (DE)

( * ) Notice: Subject to any disclaimer, the term of this patent is extended or adjusted under 35 U.S.C. 154(b) by 0 days.

(21) Appl. No.: 17/790,473

(22) PCT Filed: Jan. 15, 2021

(86) PCT No.: PCT/EP2021/050802
§ 371 (c)(1),
(2) Date: Aug. 31, 2022

(87) PCT Pub. No.: WO2021/144417
PCT Pub. Date: Jul. 22, 2021

(65) Prior Publication Data
US 2023/0037451 A1 Feb. 9, 2023

(30) Foreign Application Priority Data

Jan. 17, 2020 (EP) .................................... 20152417

(51) Int. Cl.
*H02G 3/04* (2006.01)
*H02G 11/00* (2006.01)

(52) U.S. Cl.
CPC ......... *H02G 3/0437* (2013.01); *H02G 11/006* (2013.01)

(58) Field of Classification Search
CPC .... H02G 11/00; H02G 11/006; H02G 3/0437; H02G 174/481
See application file for complete search history.

(56) References Cited

U.S. PATENT DOCUMENTS 3,110,754 A * 11/1963 Witort .................. H02G 3/0616
220/241
5,115,260 A * 5/1992 Hayward ............. G02B 6/4471
385/100

(Continued)

FOREIGN PATENT DOCUMENTS

| DE | 102012014274 A1 | 1/2014 |
| WO | 2013141714 A1 | 9/2013 |

OTHER PUBLICATIONS

International Search Report filed in the corresponding PCT Application dated Apr. 9, 2021, written in the German language; 3 pages.

(Continued)

*Primary Examiner* — Krystal Robinson
(74) *Attorney, Agent, or Firm* — Black McCuskey

(57) ABSTRACT

A cable guide having a fastening structure, a plurality of guide ducts, arranged next to one another, which are coupled to one another by the fastening structure and each guide duct of which comprises two serpentine curve-shaped duct segments between which the fastening structure is arranged, wherein the two serpentine curve-shaped duct segments are configured resiliently in such a way that they can be compressed toward the fastening structure and expanded away from the fastening structure counter to a spring force.

10 Claims, 18 Drawing Sheets

(56) References Cited

U.S. PATENT DOCUMENTS

| | | | | |
|---|---|---|---|---|
| 6,268,566 B1* | 7/2001 | Takiguchi | ............ | B60R 16/0215 |
| | | | | 174/72 A |
| 6,329,599 B1* | 12/2001 | Zimmerman | ........ | H02G 3/0487 |
| | | | | 174/68.3 |
| 6,423,901 B2* | 7/2002 | Richter | ................... | F16G 13/16 |
| | | | | 174/72 A |
| 8,003,887 B1* | 8/2011 | Hsieh | ................... | H02G 11/006 |
| | | | | 174/69 |
| 2011/0121141 A1* | 5/2011 | Tatsuta | .................... | F16G 13/20 |
| | | | | 248/49 |
| 2015/0166298 A1* | 6/2015 | Ho | ......................... | B65D 85/04 |
| | | | | 206/408 |

OTHER PUBLICATIONS

International Search Report filed in the corresponding PCT Application dated Apr. 9, 2021, translated to the English language; 2 pages.

Written Opinion filed in the corresponding PCT Application dated Apr. 9, 2021, written in the German language; 6 pages.

\* cited by examiner

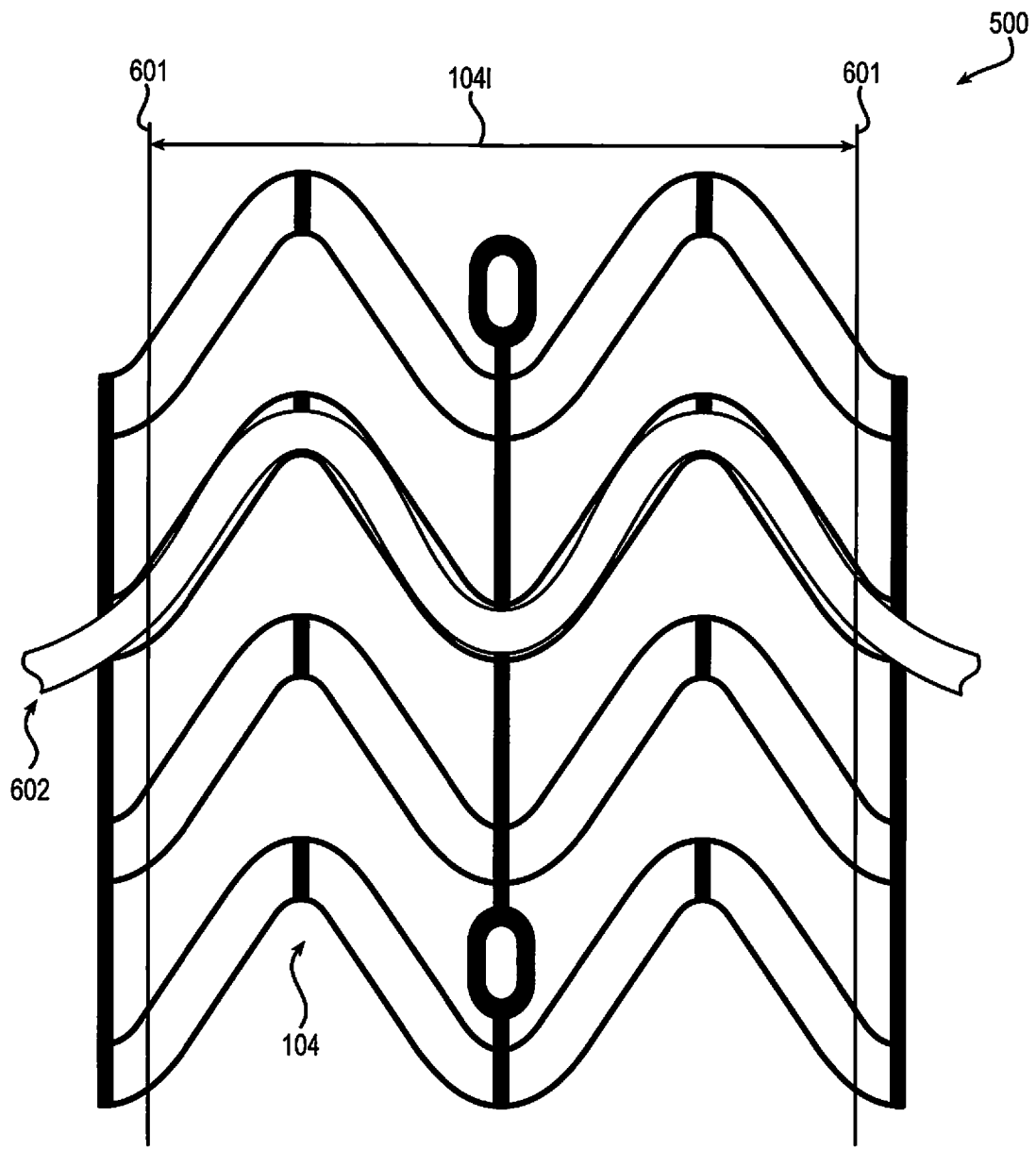
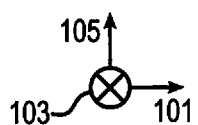
FIG. 6

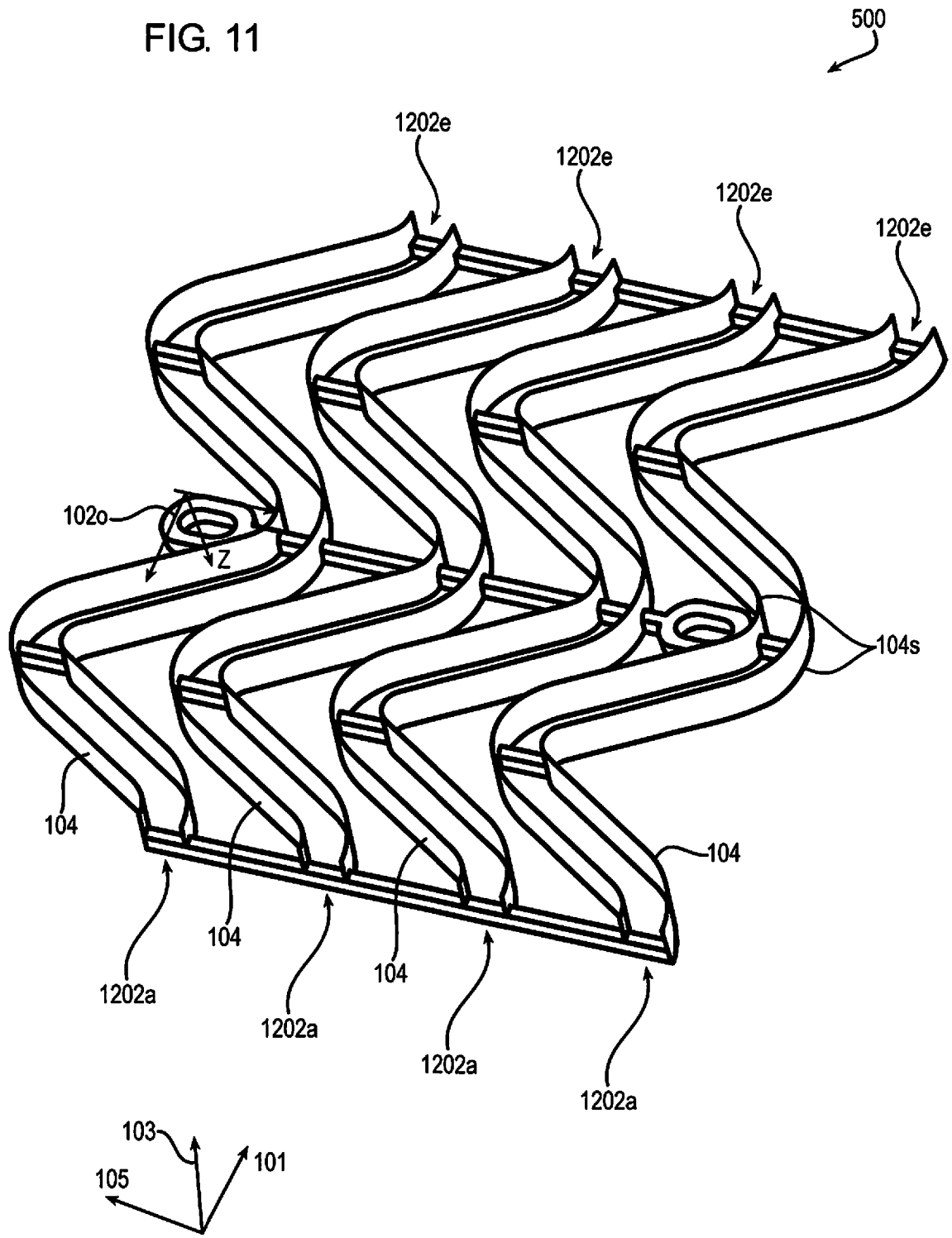

FIG. 13
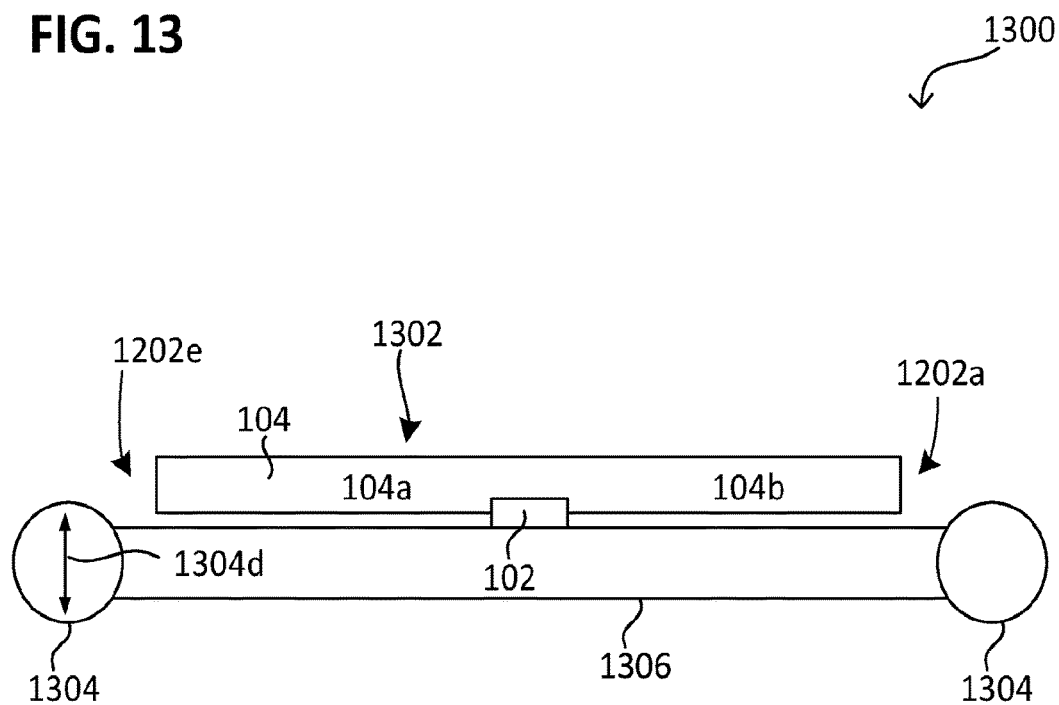
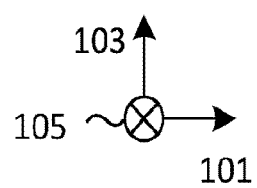

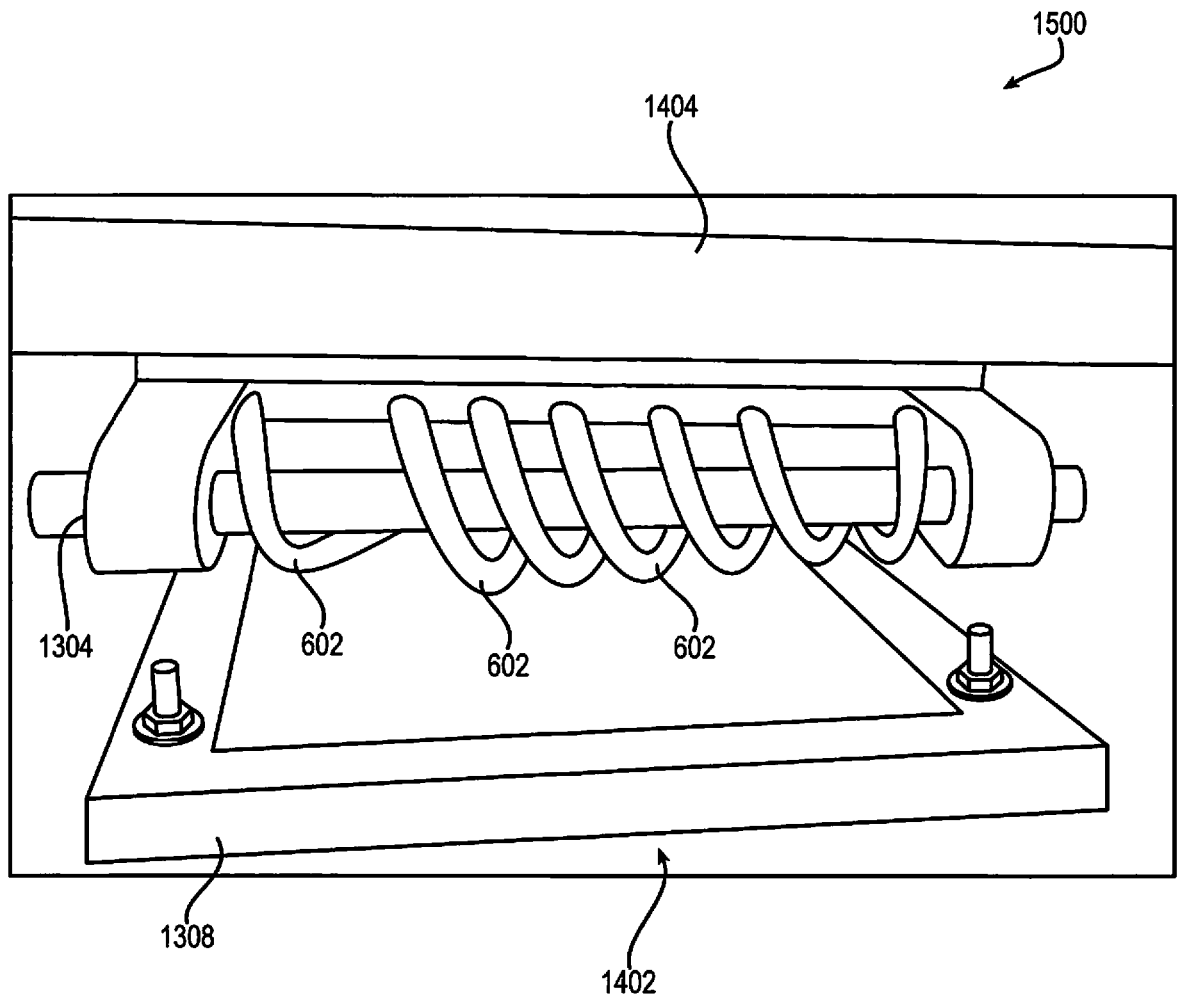
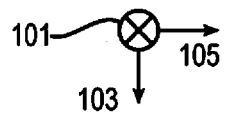
FIG. 15

FIG. 17
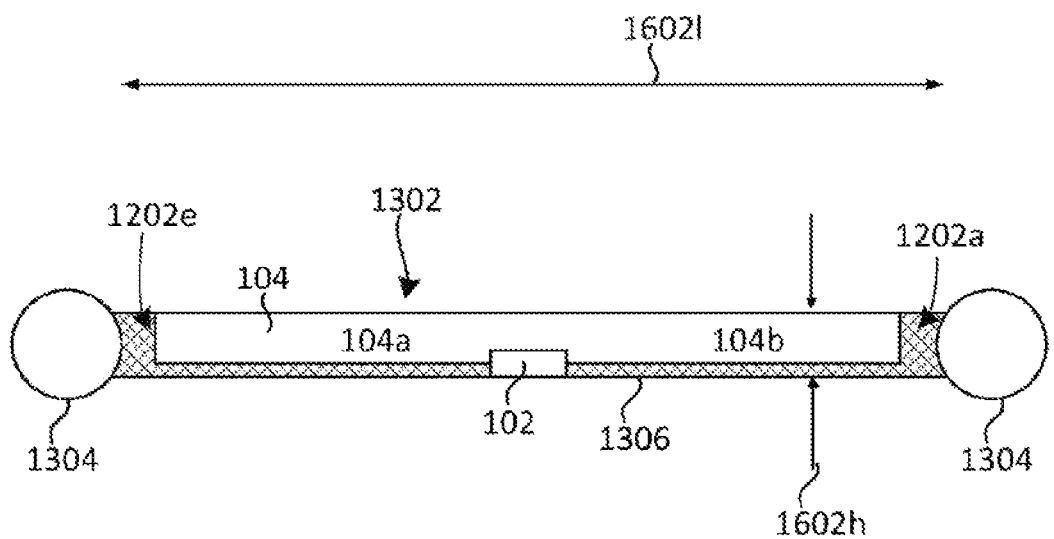
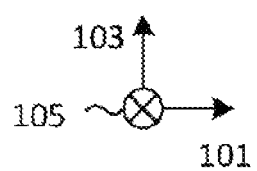

CABLE GUIDE AND DEVICE

CROSS-REFERENCE TO RELATED APPLICATIONS

This application is a National Phase filing of International Application Ser. No. PCT/EP2021/05/08/02, for a Cable guide and device, filed Jan. 15, 2021, which claims priority to European Pat. App. No. EP20152417.0, filed Jan. 17, 2020, and published as EP3852210.

BACKGROUND

Various exemplary embodiments relate to a cable guide and a device.

Cables are generally used to interconnect technical components and/or supply the latter with electrical energy. It may be necessary in some cases that these technical components are able to be moved relative to each other such that the cable or cables has or have to follow this relative movement.

If the relative movement also includes rotation, a cable which is laid over the corresponding pivot point can assume a position which is influenced by external influences, for example by the position of the two technical components relative to each other. If this pivot point is then pivoted by its opening angle, a tensile or compressive force is exerted on the cable in the region of the pivot point. This results in stresses in the cable and can subsequently also cause crushing, owing to the tensile/compressive force, which can damage the cable.

This tensile/compressive force is conventionally reduced by making it possible for the length of the cable to be compensated. One option for doing this is a so-called cable guide in which the cable is laid close to the pivot point in a wave shape which compensates the tensile/compressive force.

According to different embodiments, it has been clearly seen that conventional solutions for length compensation are complicated and inflexible. This makes it difficult to use them in particular when two pivot points (provided, for example, by pivot joints) are present, spaced apart from each other, and it is intended that the cable or cables is or are guided over both pivot points. In the case of two pivot points, a force can pass from each of the pivot points to the cable such that the possible tensile/compressive force on the cable or cables increases and in some cases acts non-uniformly. In particular in the case of multiple cables, the cables can become entangled such that they obstruct one another.

SUMMARY

According to different embodiments, a cable guide and a device which comprises the latter are provided which can be produced more uncomplicatedly, more efficiently, and simply. It is, for example, made easier to hold a large number of cables separated from one another.

According to different embodiments, a cable guide can comprise: a fastening structure, a plurality of guide ducts, arranged next to one another (for example, physically separated from one another), which are coupled to one another by means of the fastening structure, and each guide duct of which comprises two serpentine curve-shaped duct segments between which the fastening structure is arranged, wherein the two serpentine curve-shaped duct segments are configured so that they are resilient in such a way that they can be compressed toward the fastening structure and expanded away from the fastening structure, counter to a spring force.

It is clear that each of the cables is guided between the pivot points, next to one another, along a path (also referred to as a pivot path), for example along a wave-shaped cable path (also referred to as a wave path). The cable guide can house a length of cable, and release it again, dynamically. This takes place simultaneously both at just one of the pivot points and at both pivot points. The wave path can be configured in such a way that a fixing means (for example, in the center) between the two pivot points holds the cable guide in place.

The wave path can thus expand in response to a tensile force acting on the cable (for example, when the angle of rotation at the pivot point changes) and/or contract accordingly in the case of a compressive force. This is possible for both pivot points and both directions. For example, the cable guide can be used on a stand for a display (also referred to as a monitor) or for a PC (personal computer), for example a so-called all-in-one computer. An all-in-one computer is understood to be a desktop computer in which the motherboard and the monitor are housed in a common casing. The two pivot points enable the display to be positioned in different ways.

BRIEF DESCRIPTION OF THE DRAWINGS

In the drawings:

FIGS. 1 to 11 each show a cable guide according to different embodiments in different schematic views;

FIGS. 13 to 18 each show a device according to different embodiments in different schematic views.

DETAILED DESCRIPTION

Figure 1:
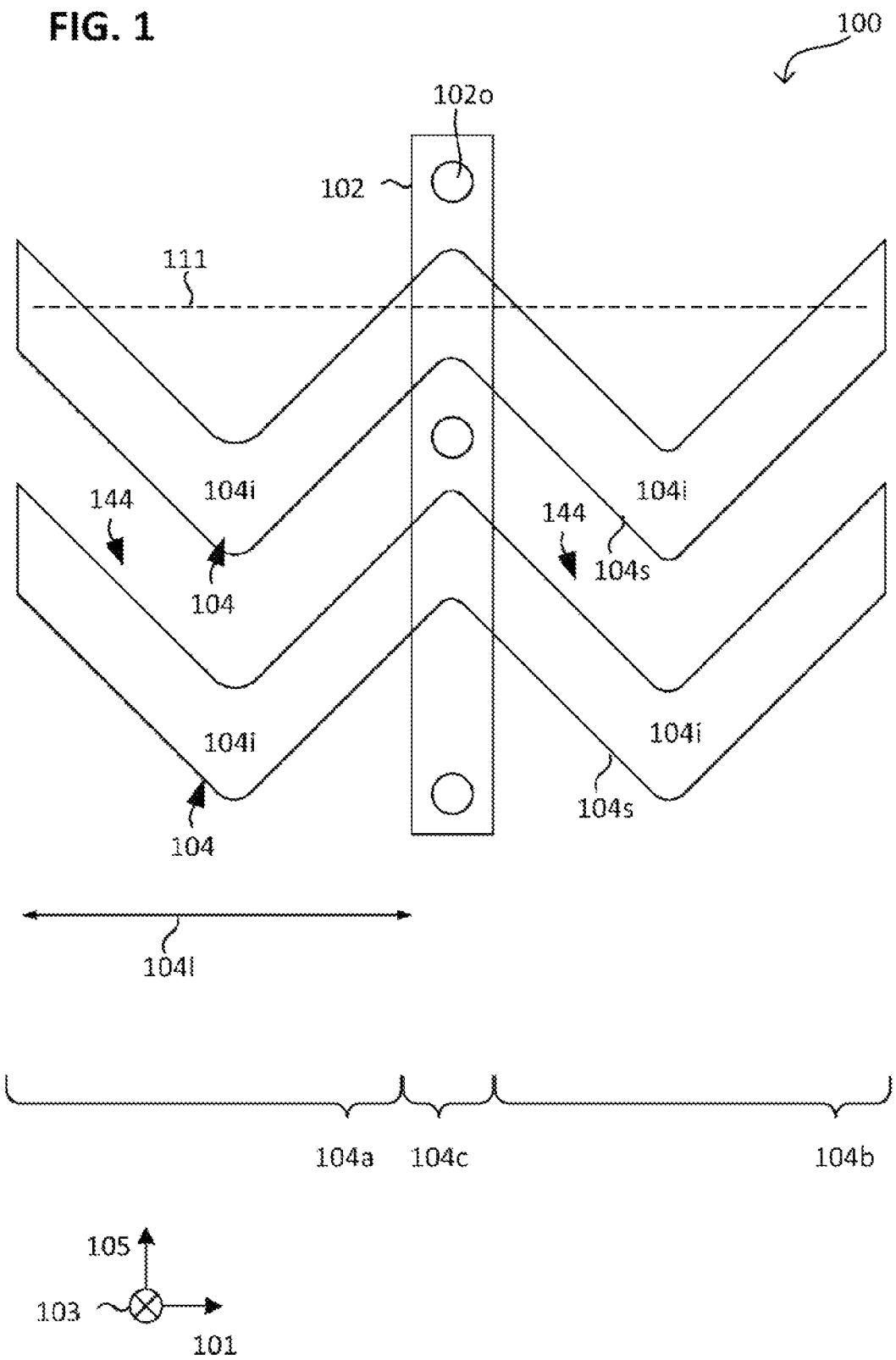

In the following detailed description, reference is made to the attached drawings which form part thereof and in which specific embodiments in which the invention can be applied are shown for illustrative purposes. In this respect, directional terms such as "upper", "lower", "forward", "backward", "front", "rear", etc are used with reference to the orientation of the drawing(s) described. Because components of embodiments can be positioned in a number of different orientations, the directional terms are used for illustrative purposes and imply no limitation. It should be understood that other embodiments can be used and structural or logical changes can be made without going beyond the scope of protection of the present invention. It should be understood that the features of the different exemplary embodiments described herein can be combined with one another, unless explicitly stated otherwise. The following detailed description is therefore not to be understood in a limiting sense and the scope of protection of the present invention is defined by the attached claims.

Within the scope of this description, the terms "connected", "joined", and "coupled" are used to describe both a direct and an indirect connection (for example, ohmically and/or electrically conductive, for example an electrically conductive connection), direct or indirect joining, and direct or indirect coupling. Identical or similar elements have been provided with identical reference symbols in the drawings, where expedient to do so.

According to different embodiments, the term "coupled" or "coupling" can be understood in the sense of a (for example, mechanical, hydrostatic, thermal, and/or electrical), for example direct or indirect, connection and/or interaction. A plurality of elements can be coupled to one another, for example in an interaction chain along which the interaction (for example, a signal) can be transmitted. For example, two elements coupled to each other can exchange an interaction with each other, for example a mechanical, hydrostatic, thermal, and/or electrical interaction. According to different embodiments, "coupled" can be understood in the sense of a mechanical (for example, physical) coupling, for example by means of a direct physical contact (for example, a form fit, force fit, or substance-to-substance bond). A coupling can be configured to transmit a mechanical interaction (for example, force, torque, etc).

Reference is made below, inter alia, to individual components (for example, cable duct, cable segment, side wall) of the cable guide which are present multiple times. The description of the individual components can then apply analogously to each of the components.

Different dimensions and parameters are stated below for the cable guide (for example, original length, width, sinuosity, etc). These dimensions and parameters can relate to the original state (i.e. in which the cable guide is in its original form), for example without the cable housed therein.

The cable guide provided according to different embodiments can provide a small structural shape with a high capacity for deformation, without the need for moving parts.

If a cable is laid over a moving pivot point, there is a risk that the cable becomes damaged by tensile of compressive force or a plug is later pulled out of the socket. The cable guide provided according to different embodiments minimizes this risk because it can let out cable in both directions and, as required, reassume the serpentine shape (for example wave shape).

If only a small amount of structural space is present but a large number of cables need to be laid, most of the conventional solutions for length compensation can no longer be readily employed. According to different embodiments, the cables are guided next to one another so that they are flat, which prevents the cables from affecting each other. Moreover, compressive/tensile force can be distributed uniformly over all the cables which are housed by the wave shape.

By virtue of a serpentine shape (for example, a wave shape) in combination with a suitable choice of material (for example, an elastomer) and material wall thickness, different cables can be forced into the serpentine shape (for example, wave shape) (for example, forced routing in a wave path). If a tensile force is exerted on one side of the cable, the serpentine curve (and clearly the wave shape) is flattened such that cable is released which is required, for example, at the pivot point. Similarly, the amplitude of the serpentine curve (for example the wave peak) increases when a compressive force is exerted on the cable such that the serpentine shape houses the cable. This applies analogously for compressive/tensile force on both sides and for other serpentine shapes (such as, for example, a wave shape).

In general, each of the duct segments can have one or more than one serpentine curve, for example two or more serpentine curves. The more serpentine curves are used, the greater the change in length that can be achieved.

According to different embodiments, the cable guide predefines a wave shape (or other serpentine shape) for the cable. The serpentine shape makes it possible to store a greater length of cable than if the cable were laid in a linear path between two points. If a tensile force is exerted on the cable in the serpentine shape, the serpentine shape is flattened and releases some of the stored cable length. The same applies, in reverse, for a compressive force.

FIG. 1 illustrates a cable guide 100 according to different embodiments in a schematic side view or view in cross-section (for example, a view directed toward the upper side of the cable guide 100).

The cable guide 100 can comprise a fastening structure 102 and a plurality (for example, 2, 3, 4, 5, 6, 7, 8, 9, 10, or more) guide ducts 104 (also referred to as cable ducts). The guide ducts 104 can be arranged next to one another in a direction 105 (also referred to as the amplitude direction 105). The amplitude direction 105 can be transverse to the compensation direction 101. The guide ducts 104 can be coupled to one another by means of the fastening structure 102 (which extends longitudinally, for example, in the amplitude direction 105). Each of the guide ducts 104 can be serpentine (for example, in the form of one or more tildes), for example can clearly have a curved shape.

A cable duct can here be understood to mean a hollow body which has an elongated cavity (also referred to as the duct interior) (cf also FIG. 2) which is open at the ends (the end openings are also referred to as the cable inlet and cable outlet).

Each of the guide ducts 104 can moreover comprise two serpentine curve-shaped duct segments 104a, 104b between which the fastening structure 102 is arranged. Each of the duct segments 104a, 104b can comprise one or more than one serpentine curve.

A curve (for example, arched and/or angled) following other curves (also referred to as a serpentine curve) is referred to as serpentine. Generally, the curve can be continuously arched, be angled once or many times, or be a mixture thereof. For example, a serpentine shape can comprise a wave shape (for example, have an arched course), a zig-zag shape (for example, have a course in which it is angled once), a rectangular shape (for example, have a course in which it is angled many times), or a mixture thereof. It is of course also possible for more complex curve shapes to be used. The more uniform the manner in which the curve extends (for example is arched), the gentler this is for the cable.

A serpentine cable duct 104 can be understood to mean that its contour or course (for example, its duct segment) deviates from a straight-line (for example, cuboid) contour. The course of a serpentine cable duct can be deflected, for example, with respect to a straight line 111, for example in such a way that the serpentine cable duct is arranged close to the line 111 in some places (i.e. at the curves). The line 111 can extend in the compensation direction 101 and/or intersect the end sections (i.e. the frontal ends) of the cable duct 104. In other words, the serpentine cable duct can comprise multiple sections (also referred to as serpentine curves) at which the course of the cable duct departs from the line 111 and then approaches it again. The line 111 can then intersect the cable duct between in each case two serpentine curves (and optionally their end sections) which are directly adjacent to each other.

The direction of the deflection of each serpentine cable duct 104 from the line 111 can lie within a plane which is spanned by the amplitude direction 105 and the compensation direction 101. Analogously to an oscillation, the amplitude can be a measure of the distance of the cable duct 104 from the line 111.

A path 1202 (cf FIG. 12A), along which the guide duct 104 or a duct segment 104a, 104b extends, can change at least once (for example, many times) the direction in which the path 1202 extends. For example, the path 1202 can comprise one or more than one curve, wherein, for example, each of the duct segments comprises at least one of the curves. The path 1202 can, for example, have the shape of a wavy line.

A serpentine curve can, analogously to a loop, for example have an inflected or arched course without the direction of arching or direction of inflection changing.

For example, each of the guide ducts 104 can comprise, between the two duct segments 104a, 104b, a connecting segment 104c (also referred to as a connecting duct segment 104c) which couples the two duct segments 104a, 104b to each other and to the fastening structure 102.

The serpentine shape can, for example, be configured in such a way that a first guide duct (for example, each of the duct segments) extends around a region 144 into which a second guide duct projects. In other words, the plurality of guide ducts can overlap one another (for example, with respect to the compensation direction 101). This saves space.

For example, the serpentine shapes of the plurality of guide ducts 104 can be congruent with one another. This reduces collisions during deformation.

The serpentine shape makes it possible for the duct segments 104a, 104b to be compressed in a direction 101 (referred to simply as the compensation direction 101) toward the fastening structure 102 and/or to be expanded away from the fastening structure (both more generally also referred to as deformation). This alters a first spacing or length 104l of the guide duct 104 in the compensation direction 101. A, for example, arching of the serpentine shape can increase in the event of compression and decrease accordingly in the event of expansion.

The serpentine curve-shaped duct segments 104a, 104b (or their material) can moreover be configured to be resilient. Resilient can be understood to mean that a body (or its material) can be deformed elastically counter to a restoring force (the so-called spring force) which returns the body to its original shape. The deformation can be expressed in a simplified fashion as the change in length $\Delta L = L - L_0$ of the body or as the ratio $\varepsilon$ between $\Delta L$ and the original length $L_0$ (i.e. the length of the original shape or the original length) of the body, i.e. $\varepsilon = \Delta L / L_0$. The restoring force can (for example, up to the yield point) depend linearly on the magnitude of the deformation (for example, the change in length $\Delta L$) and be zero in the original shape. However, specific materials can also have more complex deformation interdependencies or yield points.

The resilient deformation can include essentially no plastic deformation. i.e. the residual strain related to the original length $L_0$ of the body (i.e. plastic deformation) is less than 1% after the stress has been removed. This ensures that the deformation of the serpentine curve-shaped duct segments 104a, 104b is essentially reversible. It can, for example, be understood that the resilient deformation takes place below the yield point. If the yield point cannot be clearly identified, for example in tests under tensile force, the so-called 0.2% limit of elasticity can be defined instead as the yield point. The 0.2% limit of elasticity is that (single-axis) mechanical stress at which the residual strain related to the original length $L_0$ of the body (i.e. plastic deformation) is precisely $\varepsilon = 0.2\%$ after the stress has been removed.

The fastening structure 102 can, for example, be essentially elongated and comprise one or more than one through opening 102o (also referred to as fastening openings 102o). The cable guide 100 can be fastened to the fastening structure 102 by means of the fastening openings 102o. For example, screws can be inserted into the fastening openings 102o. As an alternative or in addition to the fastening openings 102p, other form-fitting elements (also referred to as fixing elements) can also be used, for example catches, tabs, nipples, tongue-and-groove connectors, or the like.

Form-fitting elements, designed for opening 102o for fastening to a support structure between the pivot points, can, for example, be used. All the serpentine curves (for example, wave-shaped curves) can optionally be coupled to one another by means of connecting webs, as will be described below in more detail, which makes it easier to lay the cable in the serpentine shape.

Length compensation in both directions, independently of each other, can be effected by means of the central arrangement of the fastening structure 102. In the case of an asymmetric arrangement of the fastening structure, it can also be obtained that a greater amount of length compensation is made available for one or other end.

Figure 2:
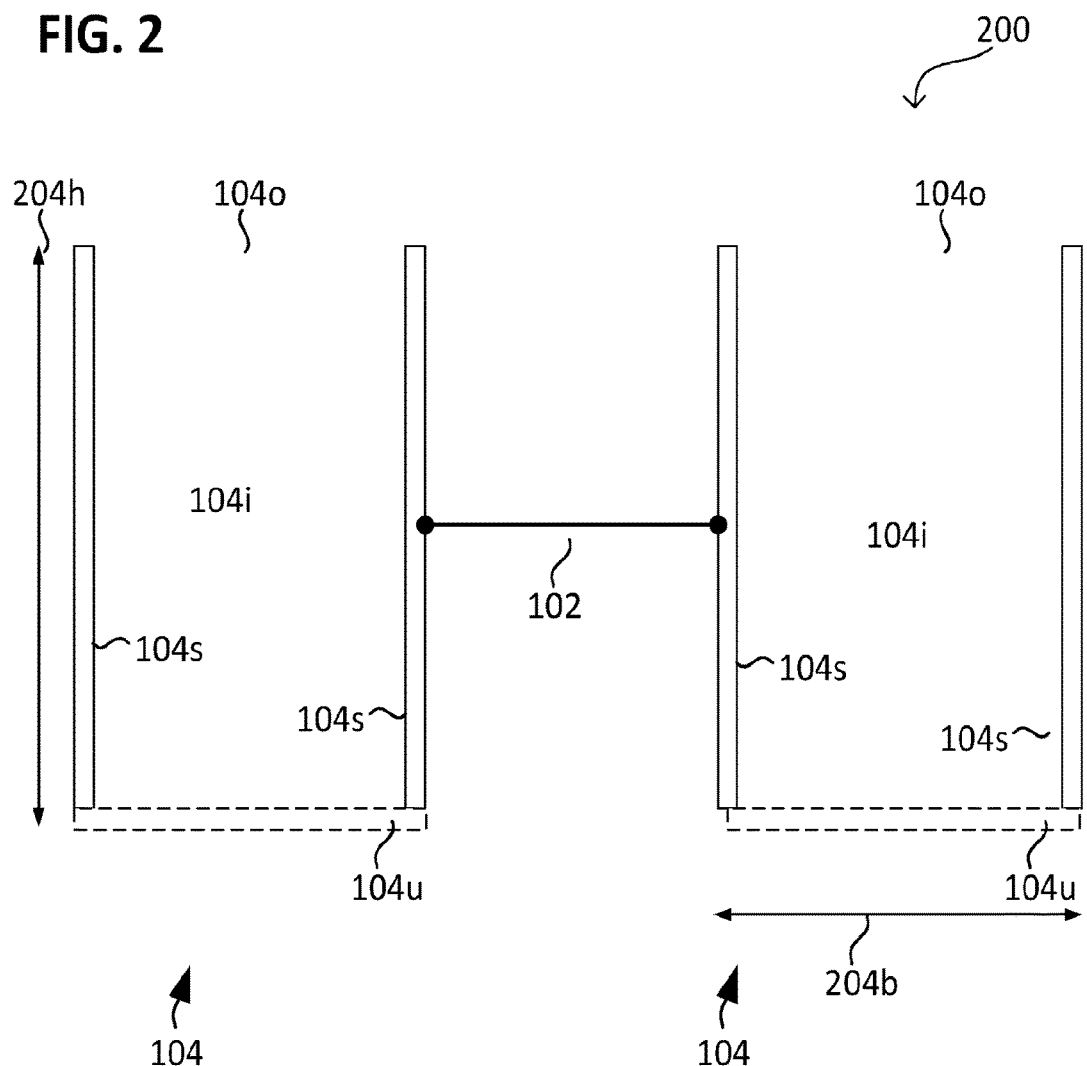

FIG. 2 illustrates a cable guide 200 according to different embodiments in a schematic side view or view in cross-section (for example, a view directed away from the compensation direction 101), for example configured in the manner of the cable guide 100.

The duct interior 104i of each cable duct 104 can follow the course of the cable duct 104. One or more than one cable can selectively be arranged in the duct interior 104i. Each cable duct 104 (for example, each of the duct segments 104a, 104b) can accordingly have a serpentine curve-shaped section of the duct interior 104i. The cable duct 104 can comprise a plurality (for example, two or more, for example three) duct walls 104s, 104u which delimit the duct interior 104i, for example at least two side walls 104s of which delimit the duct interior 104i on opposite sides of the duct interior 104i.

Each cable duct 104 can optionally comprise a base wall 104u. The base wall 104u can comprise, for example, multiple through openings. This improves the deformability of the cable duct 104. The through openings can be configured in such a way that only webs (also referred to as base connecting webs), which (as will be described in more detail below) couple the side walls 104s of a cable duct 104 to each other, remain between the through openings as the base wall 104u.

The side walls 104s of each cable duct 104 can be coupled to each other (for example, in pairs), for example by means of the fastening structure 102. Alternatively or additionally, the two side walls 104s of a cable duct 104 can be coupled by means of the base wall 104u (for example, its base connecting webs) and/or the like.

Each cable duct 104 can moreover comprise an opening 104o (for example, on the upper side) which exposes the duct interior 104i (for example, in the direction 103). The opening 104o can extend, for example, uninterruptedly or at least uninterruptedly in some regions from one end section to the other end section of the guide duct 104 (for example, along the whole serpentine course). This makes it easier to arrange a cable in the cable interior 104i. Each cable duct 104 can optionally also comprise a duct lid for closing the opening 104o or a duct cover (configured in a similar manner to the base wall 104u).

The width 204b and height 204h of each guide duct can be adapted to the cable to be used, as will be described in more detail below.

Different types of cable, specifically the bending stiffness of cable, can be accounted for by a suitable choice of material and the choice of the wall thickness of the side walls. The material of the cable guide 200 (for example, of the fastening structure and/or the cable ducts) can, for example, be a polymer, for example an elastomer (which provides a high yield point) and/or a thermoplast (enables its production by means of casting or printing, for example by means of 3D printing). Other materials can, however, also be used, for example a metal (for example, spring sheet metal).

The height 204h of each guide duct 104 (for example, its duct interior 104i) can, for example, be greater than approximately 1 mm (millimeters), for example be in a range from approximately one mm to approximately twenty mm, for example in a range from approximately two mm to approximately ten mm. The width 204b of each guide duct 104 (for example, its duct interior 104i) can, for example, be greater than approximately one mm, for example be in a range from approximately one mm to approximately twenty mm, for example in a range from approximately two mm to approximately ten mm A wall thickness of each side wall 104s (the extent thereof in the amplitude direction 105) can, for example, be greater than approximately 0.1 mm (for example, than approximately 0.5 mm), for example be in a range from approximately 0.1 mm to approximately three mm (for example, to approximately two mm). It can be understood that these dimensions can be adapted, depending on the specific application, to the cable (for example, its bending stiffness) and the material used for the side wall 104s.

The width 204b can correspond, for example, approximately to the height 204h. This is particularly suitable for round cables. Alternatively, the width 204b can be smaller than the height 204h. This is particularly suitable for flat cables.

Although not illustrated, the one or more than one side wall 104s of each guide duct 104 can optionally comprise one or more than one through opening. The through opening or openings can be configured in such a way that only webs (also referred to as base connecting webs), which force the cable into the serpentine shape, remain between the through openings. A web of the side wall 104s can be provided, for example, in the form of a prong which is supported on the base wall.

Although not illustrated, the cable guide 200 can optionally comprise one or more than one spring (for example, comprising a metal or a polymer) which provides the restoring force. This achieves a higher restoring capacity.

Figure 3:
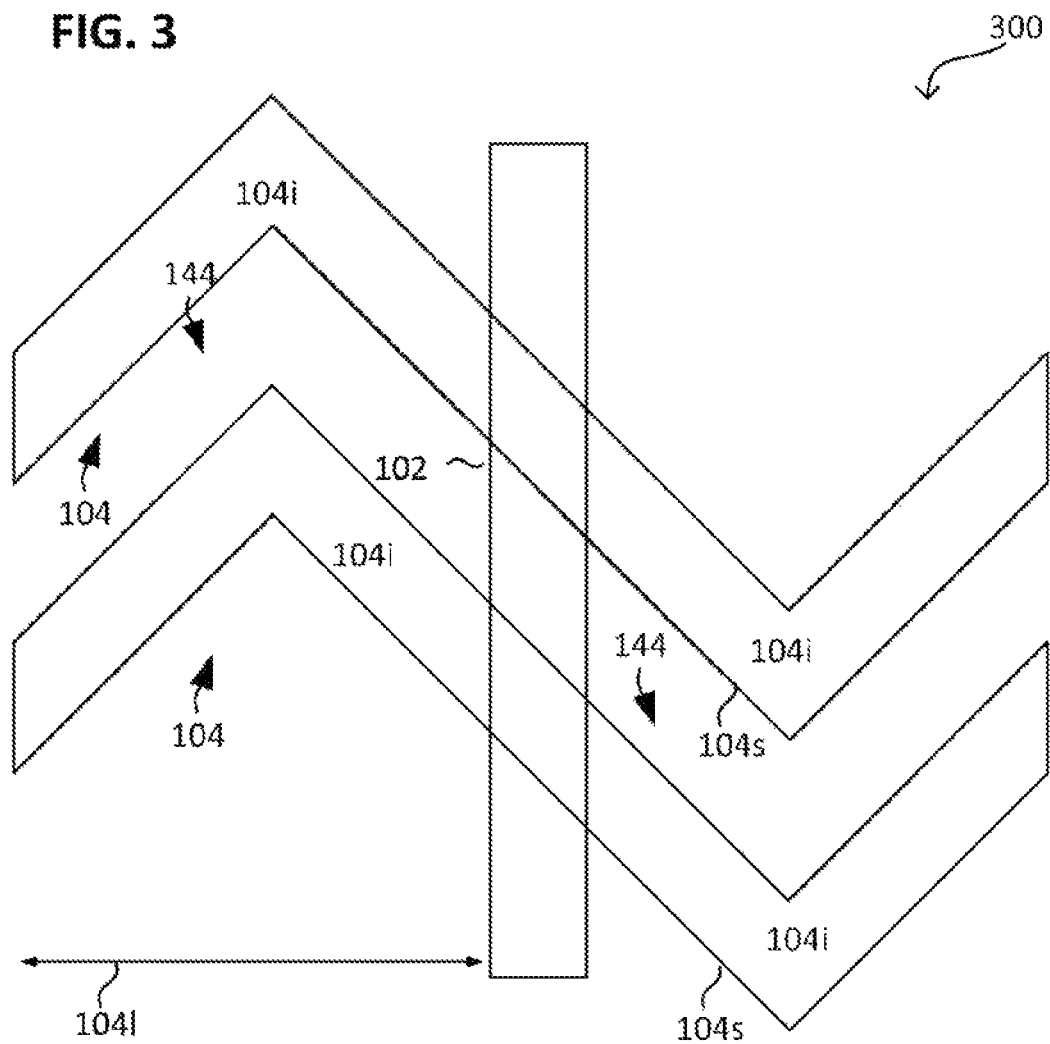

FIG. 3 illustrates a cable guide 300 according to different embodiments in a schematic side view or view in cross-section (for example, a view directed at an upper side of the cable guide 300), for example configured in the same way as the cable guide 100 or 200, with the distinction that the connecting segment 104c extends in a straight line.

Figure 4:
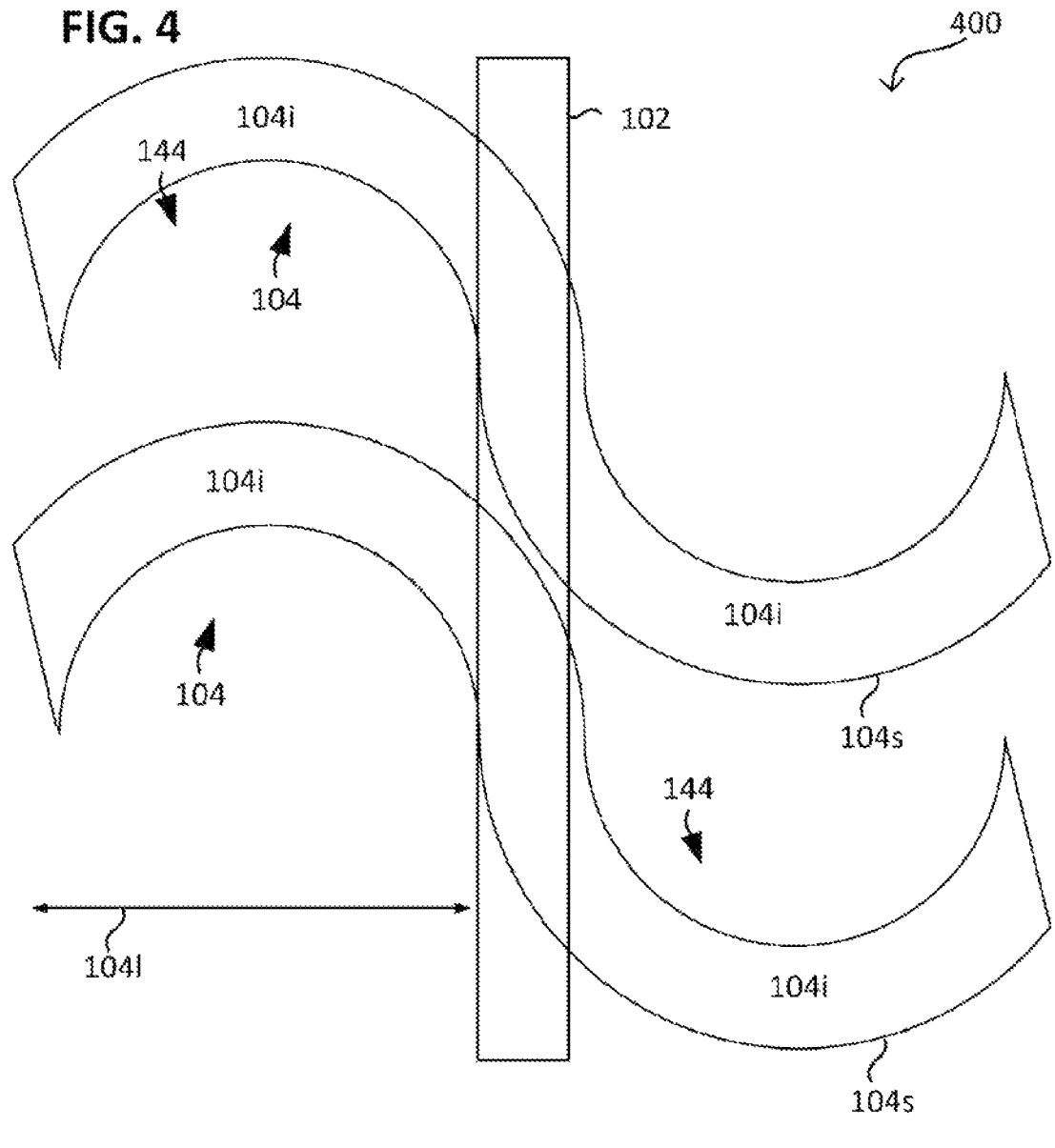

FIG. 4 illustrates a cable guide 400 according to different embodiments in a schematic side view or view in cross-section (for example, a view directed at an upper side of the cable guide 400), for example configured in the same way as one of the cable guides 100 to 300, with the distinction that the serpentine shape has a curvature.

Figure 5:
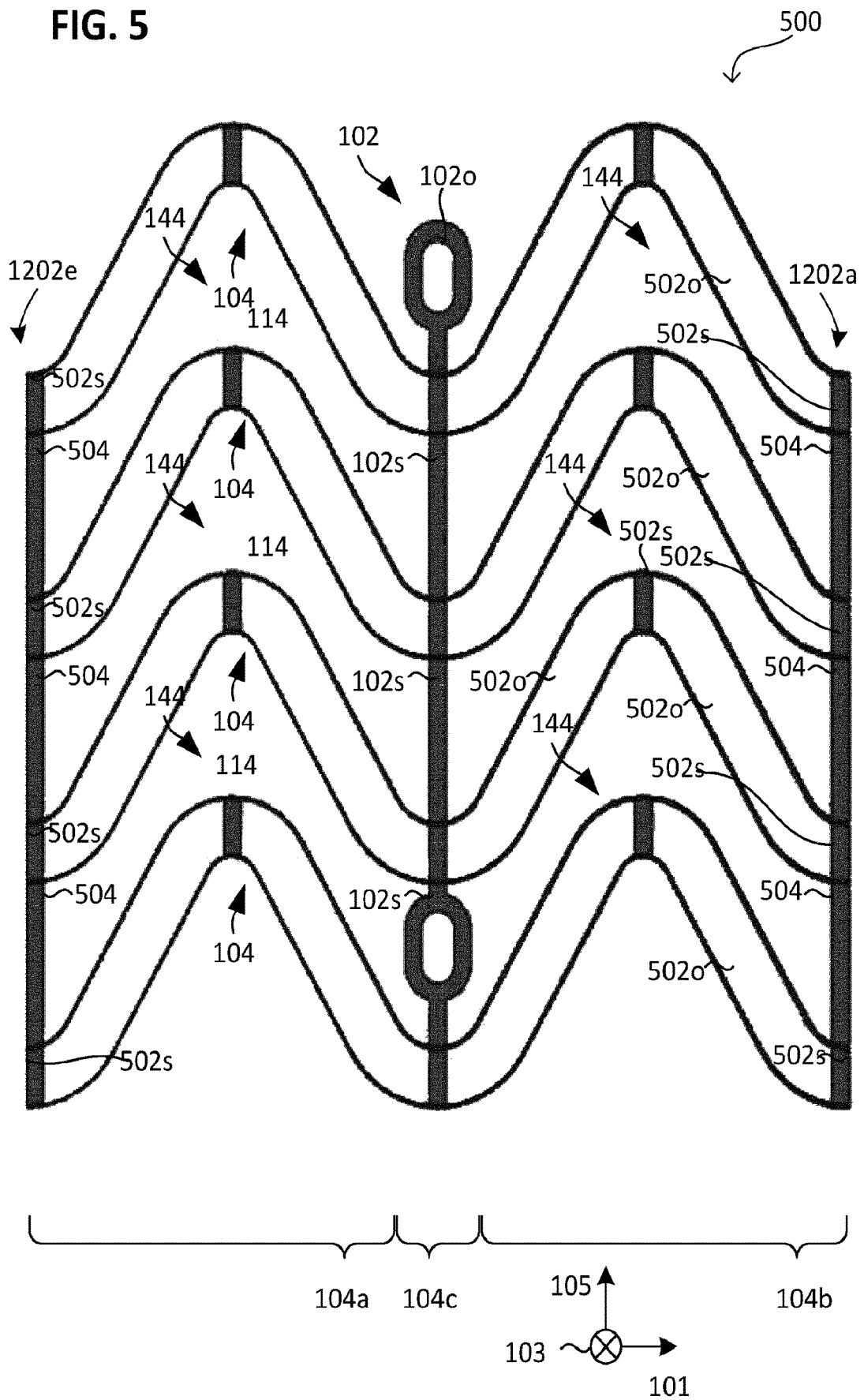

FIG. 5 illustrates a cable guide 500 according to different embodiments in a schematic side view or view in cross-section (for example, a view directed at an upper side of the cable guide 500), for example configured in the same way as one of the cable guides 100 to 400, with the distinction that the cable guide 500 comprises four cable ducts 104. The cable ducts 104 can have a wave shape, wherein, for example, each of the two duct segments 104a, 104b of each cable duct 104 can have at least one wave-shaped curve.

The connecting webs of the cable guide 500 (also referred to simply as webs) are also illustrated. The connecting webs for the cable guide 500 comprise, for example, base connecting webs 502s, fastening structure connecting webs 102s, and/or edge connecting webs 504. The webs 504, 502s, 102s can be elongated in the amplitude direction 103. The use of webs 504, 502s, 102s generally saves material. They moreover require less structural space because the latter is required only for the height of the connecting webs in addition to the cable (for example, its cable thickness).

The cable base can comprise the base connecting webs 502s and through openings 502o. For example, the cable base of each duct segment 104a, 104b can comprise two or more through openings which are physically separated from one another by means of a base connecting web 502s. For example, one or more than one (for example, two or more, for example three or more) base connecting web 502s of a guide duct 104 can couple its side walls 104s to each other. The side walls 104s can be connected to one another, for example, in each case at the wave-shaped curves by means of the base connecting webs 502s so that a cable housed in the cable duct 104 likewise assumes the wave shape.

The fastening structure connecting webs 102s (i.e. webs of the fastening structure 102) can couple the cable ducts 104 to one another and/or its side walls 104s to one another. The fastening structure connecting webs 102s can comprise two or more fixing points, for example provided by means of a slot 102o for fastening to a component between the joints thereof. Length compensation in both directions can be effected independently of each other by means of the (for example, central) arrangement of the fastening structure 102 between the two duct segments 104a, 104b.

A frontal side of each duct segment 104a, 104b which is situated opposite the fastening structure 102 can provide a duct inlet 1202e and duct outlet 1202a through which a cable extends into the guide duct or out of it. The cable guide 500 can comprise two groups of edge connecting webs 504, a first group of connecting webs 504 of which couples respective immediately adjacent cable inlets 1202e to one another, and a second group of connecting webs 504 of which couples respective immediately adjacent cable outlets 1202a to one another. This ensures greater stability.

In the case of an asymmetric arrangement of the fastening structure 102 (for example, further to the left-hand side or further to the right-hand side), it can be ensured that a first duct segment 104a of the cable duct 104 provides greater length compensation than a second duct segment 104b of the cable duct 104.

According to different embodiments, each guide duct 104 can be configured to house one or more than one cable which then extends through the cable interior, for example into the duct inlet and out of the duct outlet. The respective immediately adjacent guide ducts 104 can optionally have a spacing from one another which corresponds essentially to the spacing of the side walls 104s of one of the guide ducts from each other (for example, deviates by less than 30% therefrom). This ensures that an intermediate space 114, in which one or more than one cable can be housed, is provided between the respective immediately adjacent guide ducts 104. This increases the capacity of the cable guide 500. For example, in the case of n guide ducts 104, n−1 intermediate spaces 114 can be additionally provided (where, for example, n=1, 2, 3, 4, 5, . . . , 10, or more).

FIG. 6 illustrates the cable guide 500 in an original state according to different embodiments in a schematic side view or view in cross-section (for example, a view directed at the upper side of the cable guide).

In the original state, the end sections 601 situated opposite each other (also referred to as the duct inlet 1202e and duct outlet 1202a) of a guide duct 104 can have a first spacing 104l (also referred to as the original length $L_0$ of the guide duct 104) from each other.

Figure 7:
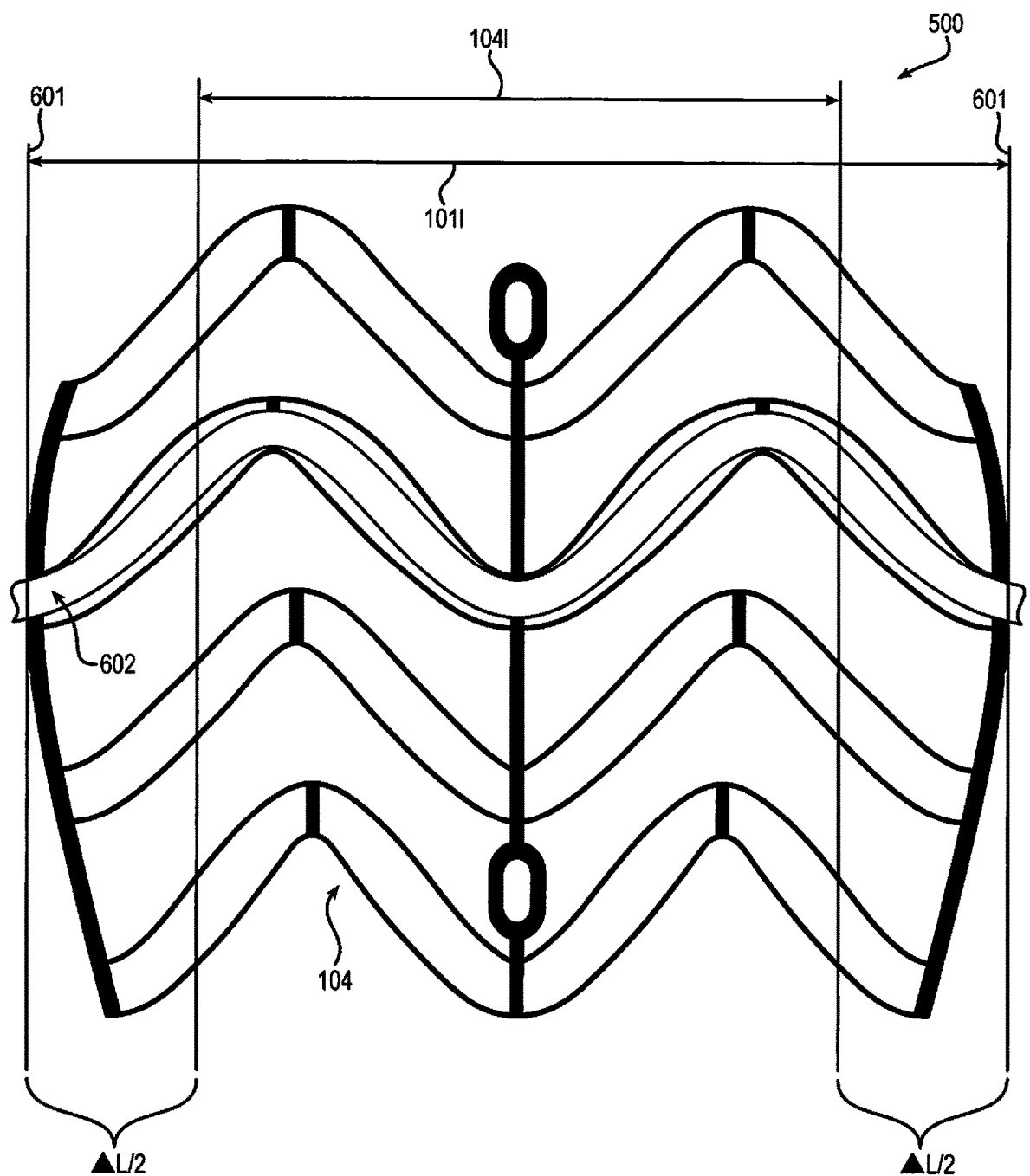

FIG. 7 illustrates the cable guide 500 in an expanded state according to different embodiments in a schematic side view or view in cross-section (for example, a view directed at the upper side of the cable guide).

When the cable guide 500 expands, the spacing of the end sections 601 of the guide duct 104 from each other can increase or its amplitude can decrease.

In the expanded state of the cable guide 500, the end sections 601 situated opposite each other of the guide duct 104 can have a second spacing 101l from each other which is greater than the first spacing 104l. The deformation $\varepsilon = \Delta L/L_0$ of the expanded state with respect to the original shape can be more than approximately 10%, for example more than approximately 15%, for example more than approximately 20%, for example more than approximately 25%, for example more than approximately 30%, for example more than approximately 35%, for example more than approximately 40%. In other words, when the cable guide 500 expands, the spacing of the end sections 601 of the guide duct 104 from each other can increase, for example by approximately 10% or more, for example more than approximately 15%, for example more than approximately 20%, for example more than approximately 25%, for example more than approximately 30%, for example more than approximately 35%, for example more than approximately 40%.

Figure 8:
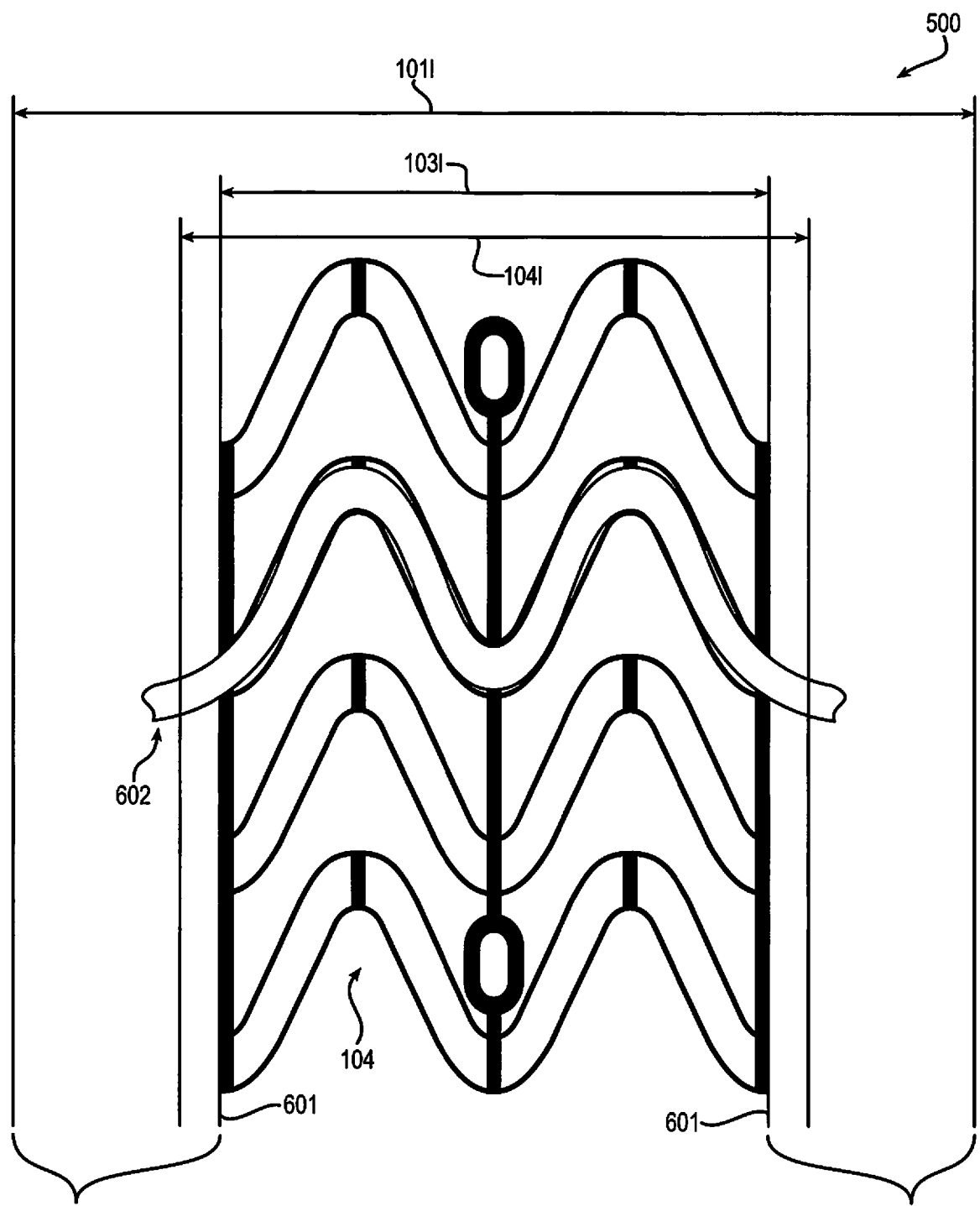

FIG. 8 illustrates the cable guide 500 in a compressed state according to different embodiments in a schematic side view or view in cross-section (for example, a view directed at an upper side of the cable guide).

When the cable guide 500 is compressed, the spacing of the end sections 601 of the guide duct 104 from each other can decrease or its amplitude can increase.

In the compressed state, the end sections 601 situated opposite each other of a guide duct 104 can have a third spacing 103l from each other which is smaller than the first spacing 104l. The deformation $\varepsilon = \Delta L/L_0$ of the expanded state with respect to the compressed state can be more than approximately 40%, for example more than approximately 45%, for example more than approximately 50%, for example more than approximately 55%, for example more than approximately 60%, for example more than approximately 65%, for example more than approximately 70%. In other words, a deformation between the compressed state and the expanded state can be effected, for example by approximately 40% or more, for example more than approximately 45%, for example more than approximately 50%, for example more than approximately 55%, for example more than approximately 60%, for example more than approximately 65%, for example more than approximately 70%.

Figure 9:
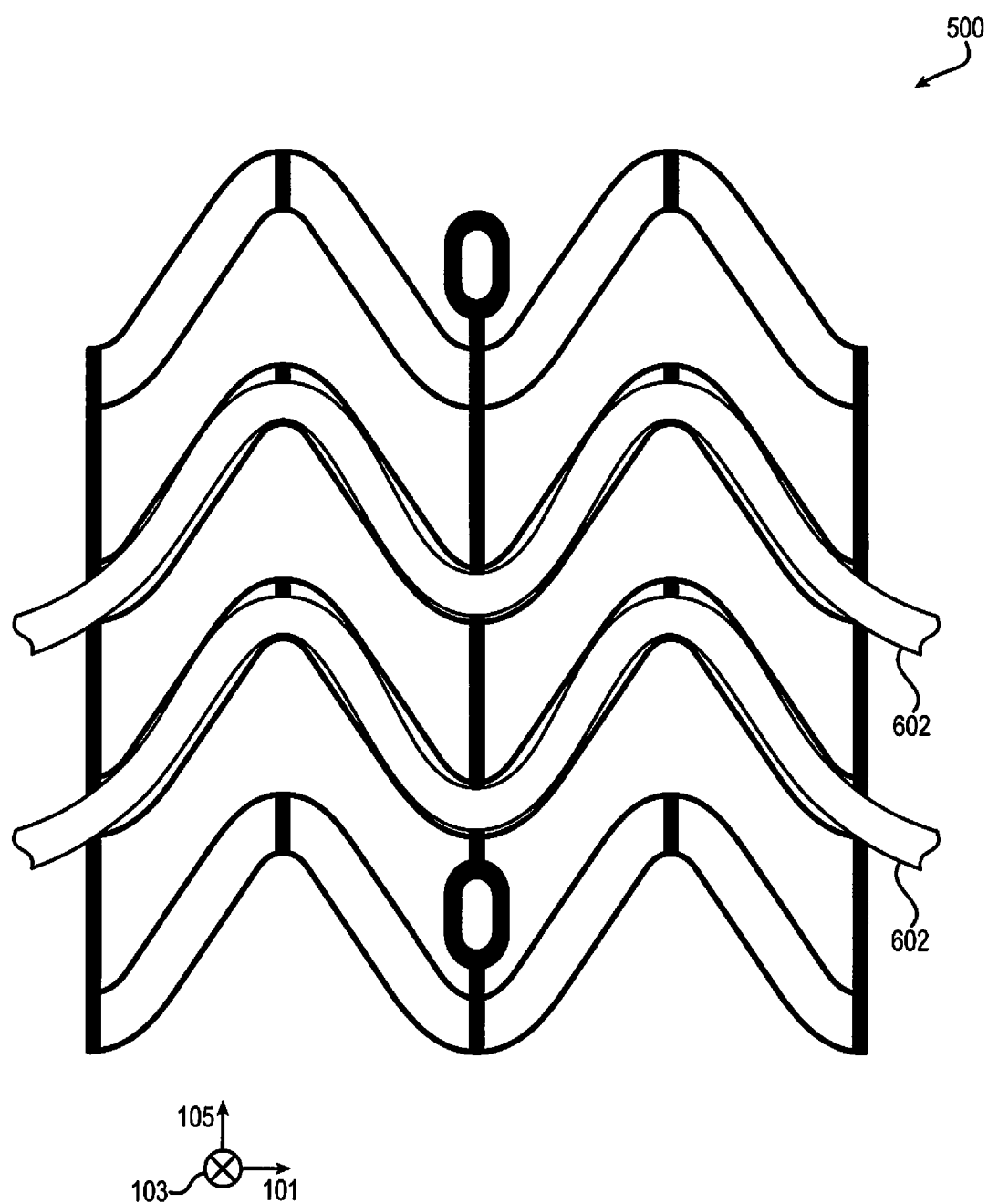

FIG. 9 illustrates the cable guide 500 according to different embodiments in a schematic side view or view in cross-section (for example, a view directed at an upper side of the cable guide), wherein a cable 602 is housed in each of two guide ducts.

Each cable 602 housed in one of the guide ducts can, in an example, be a USB cable, for example for connection to a printer, a cash drawer, a keyboard, etc. However, a (for example, multicore) cable of a different cable type can also be used. Put more generally, the cable can comprise one or more than one electrical line (also referred to as cores) which are arranged in an insulated cable sheath of the cable. For example, at least one (i.e. one or more than one) cable for communication according to a serial bus system can be configured. This makes it possible to connect components of a system which communicate with one another. Alternatively or additionally, at least one cable for supplying electrical energy can be configured, for example in the form of a cold-device cable or a low-voltage cable.

Figure 10:
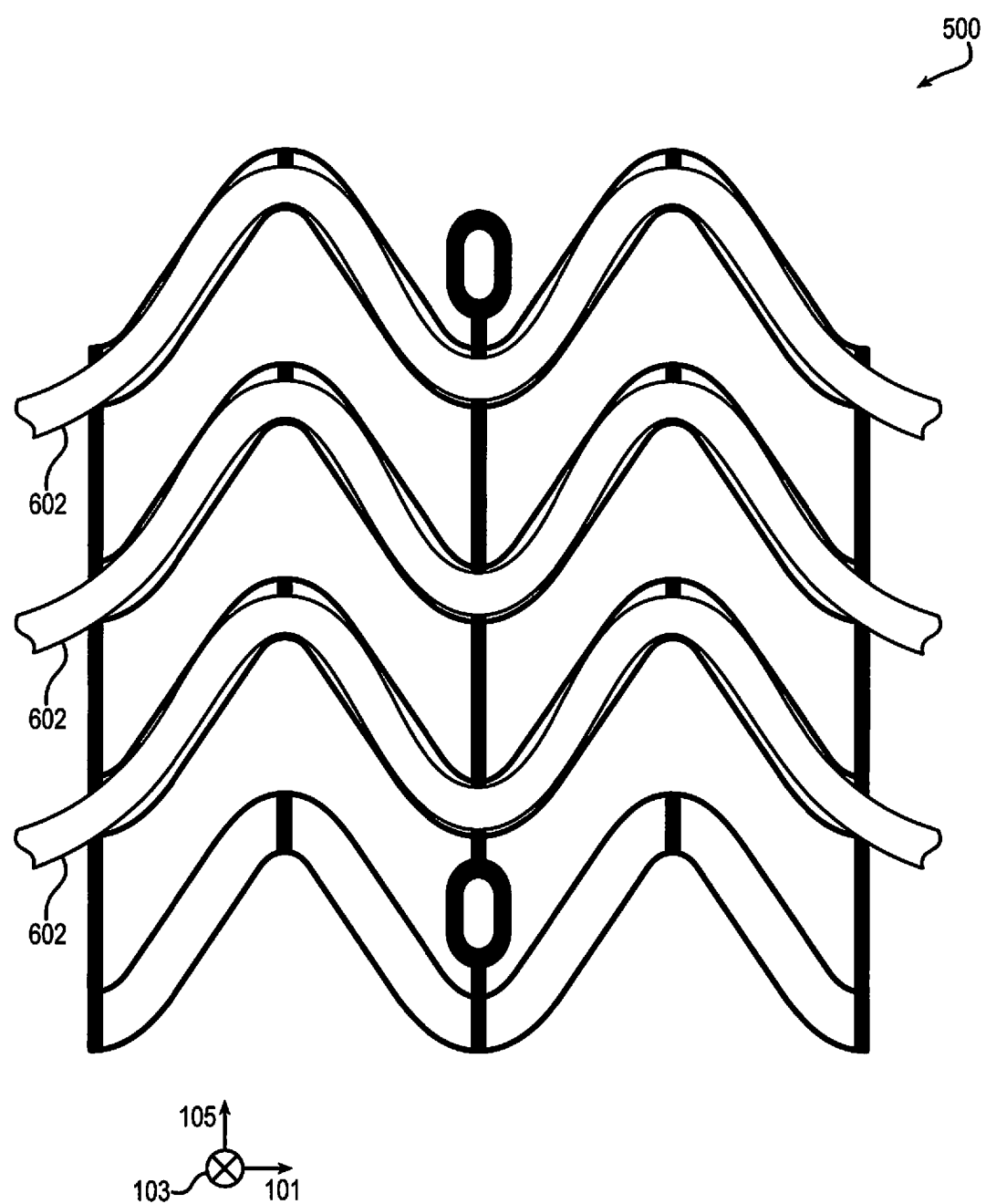

FIG. 10 illustrates the cable guide 500 according to different embodiments in a schematic side view or view in cross-section (for example, a view directed at an upper side of the cable guide), wherein a cable 602 is housed in each of three guide ducts.

FIG. 11 illustrates the cable guide 500 according to different embodiments in a schematic perspective view.

Figure 12A:
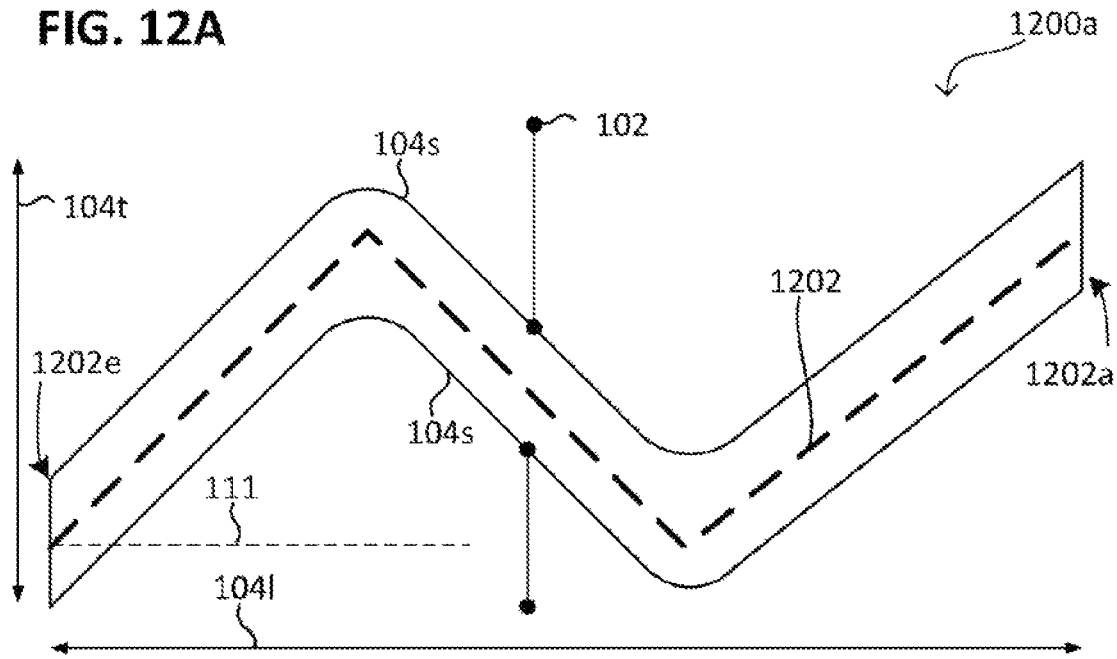
FIGS. 12A and 12B each show a cable duct according to different embodiments in different schematic views.
Figure 12B:
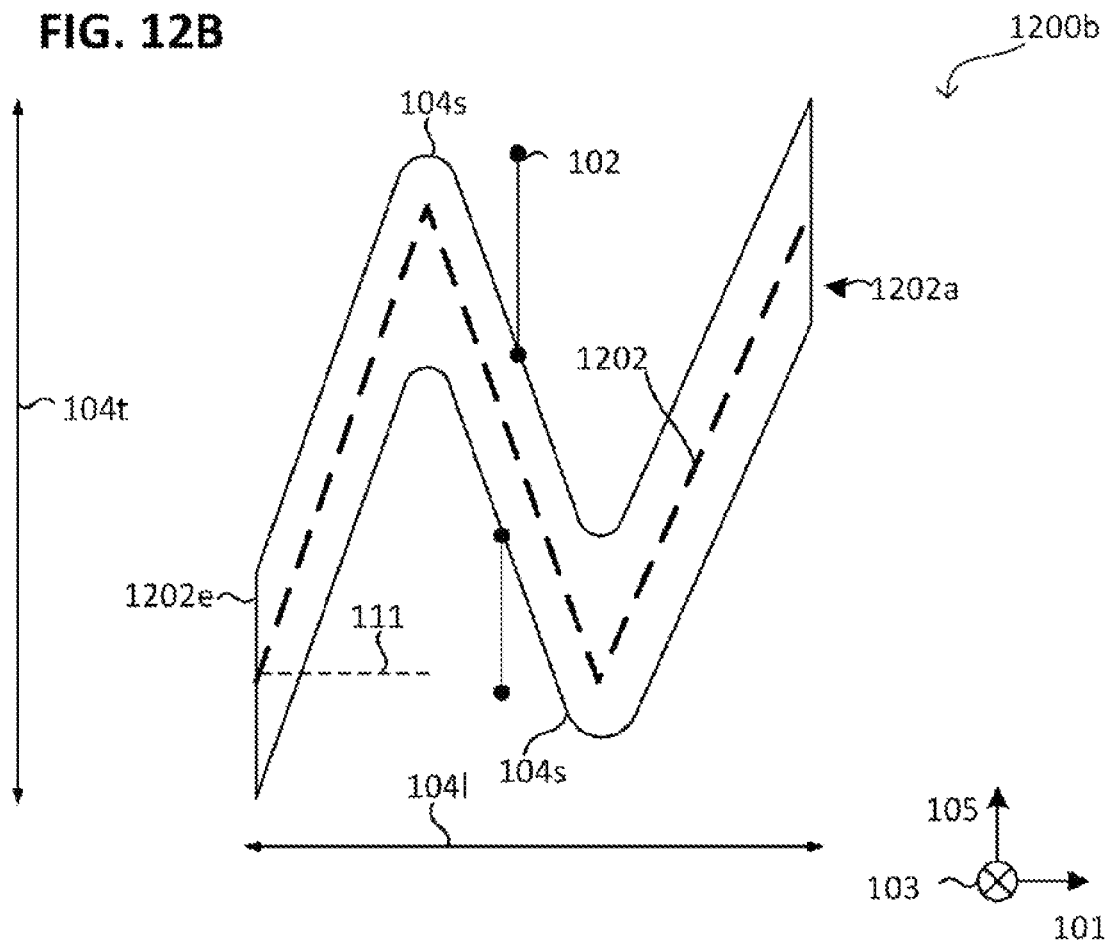

FIG. 12A and FIG. 12B each illustrate the guide duct 104 of one of the cable guides 100 to 500 according to different embodiments in a schematic view in cross-section or side view, wherein the guide duct 104 is illustrated in an expanded state 1200a and a compressed state 1200b.

The length 104l of the guide duct 104 can be its extent in the compensation direction 101. In other words, the length 104l of the guide duct 104 can correspond to the spacing of the duct inlet 1202e from the duct outlet 1202a (which expose the duct interior 104), for example projected onto a plane in which the compensation direction 101 lies.

The width 104t over the whole guide duct 104 (also referred to as the overall width) can be extent of the latter in the amplitude direction 105, for example from inflection point to inflection point. In other words, the width 104t of the guide duct 104 can correspond to the maximum spacing of the side walls 104s of the guide duct 104 from each other (which delimit the duct interior 104i), for example projected onto a plane which is transverse to the compensation direction 101. In other words, the overall width 104t of the guide duct 104 can correspond to the spacing of the outer inflection points of the cable duct 104 (which expose the duct interior 104i), for example projected onto the plane which is transverse to the compensation direction 101.

The path 1202 (also referred to as the cable path 1202) of each guide duct 104 can lie in the plane which is spanned by the amplitude direction 105 and the compensation direction 101. The cable path 1202 can be arranged in the duct interior 104i or between the two side walls 104s (for example, centrally between the latter). The length of the cable path 1202 can be the length of the distance over which the cable path 1202 extends (i.e. its run length).

The sinuosity can serve as a measure for the serpentine shape and is a measure for the maximum achievable expansion $\varepsilon$. The sinuosity s is defined as the quotient between the length l of the cable path 1202 and the straight-line spacing a of the cable inlet 1202e from the duct outlet 1202a, i.e. s=l/a.

For example, the sinuosity of each guide duct 104 can be greater than approximately 10% (for example than approximately 20%, for example than approximately 30%), for example be in a range from approximately 10% to approximately 50%. For example, the length 104l of each guide duct 104 can be smaller than approximately fifty cm, for example be in a range from approximately five cm to approximately twenty-five cm. For example, the overall width 104t of each guide duct 104 can be smaller than approximately fifteen cm (centimeters) and/or, for example, be in a range from approximately two cm (for example, from approximately five cm) to approximately fifty cm.

When the guide duct 104 expands, its length 104l can increase (for example, relatively or absolutely) more sharply than the length of the cable path 1202. When the guide duct 104 expands, its overall width 104t can decrease (for example, relatively or absolutely) more sharply than the length of the cable path 1202. This ensures that a change in length of the cable path 1202 is smaller than the deformation of the guide duct 104.

FIG. 13 illustrates a device 1300 according to different embodiments in a schematic side view or view in cross-section (for example, a view directed from the amplitude direction 105), wherein the device 1300 comprises a cable guide 1302 which is configured in the manner of one of the cable guides 100 to 500.

The device 1300 can comprise two hinges 1304 and a carrier or support structure 1306 which couples the two hinges 1304 to each other. A hinge can be understood as a swivel or pivot joint which provides precisely one degree of rotational freedom (i.e. no further degrees of rotational freedom or degrees of freedom of translational movement). In other words, a hinge can be a joint which can rotate about an axis (degree of freedom f=1).

Each pivot joint can provide a so-called pivot point about which the support structure 1306 can rotate under the action of a force. Each pivot joint can have an axis of rotation about which the support structure 1306 can rotate under the action of a force, wherein the axis of rotation is transverse to the compensation direction 101 and/or in the amplitude direction 105. The following description with regard to the hinge 1304 can apply analogously also for a pivot joint of another type, for example a pivot joint which provides more than one degree of rotational freedom.

The cable guide 1302 can be arranged between the two hinges 1304 and be fastened to the support structure 1306 with its fastening structure 102.

The device 1300 can comprise, for example, a frame which comprises the support structure 1306 and the hinges 1304. The frame can be, for example, a holding device, for example a stand.

The cable guide 1302 can be configured in such a way that the two duct segments extend away from the fastening structure 102 (in each case on both sides) toward the two hinges 1304, for example in the compensation direction 101.

One or more than one cable, for example k cables (where, for example, k=1, 2, 3, 4, 5, . . . , 11, or more), can be housed in the cable guide 1302. The number of cables k can, for example, be greater than the number n of guide ducts 104.

Each hinge 1304 can have, for example, an extent 1304d (transverse to its axis of rotation) which is smaller than the sinuosity of each guide duct 104, for example smaller than half the sinuosity of each guide duct 104. This ensures a sufficient capacity for expansion. Alternatively or additionally, the extent 1304d can be greater than the height of each guide duct (for example, its duct interior). This minimizes the required structural space.

Figure 14:
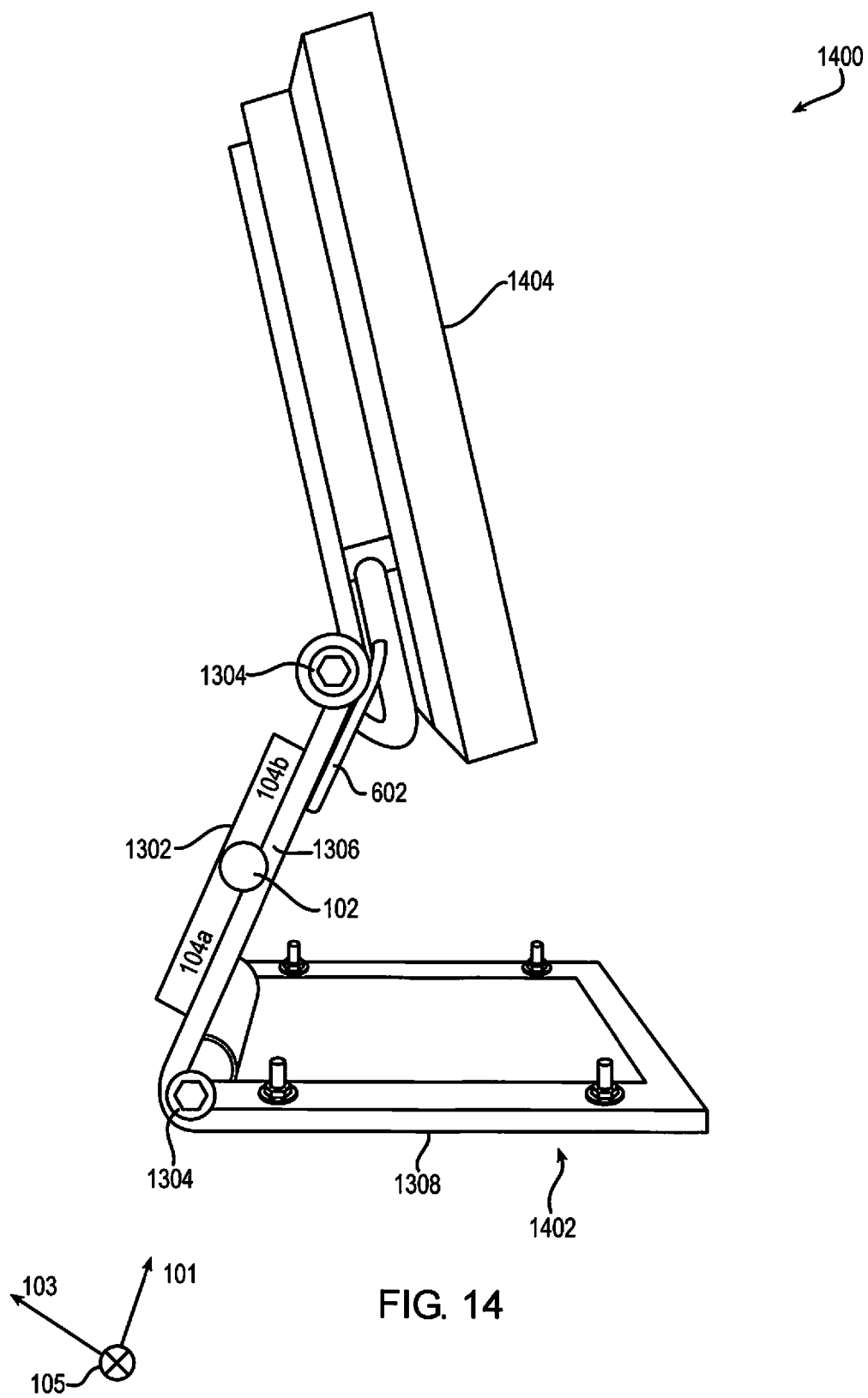

FIG. 14 illustrates a device 1400 according to different embodiments in a schematic side view (for example, a view directed from the amplitude direction 105) which can be configured in the manner of the device 1300, and FIG. 15 illustrates the device 1400 in a schematic side view (for example, a view directed from the compensation direction 101).

The device 1400 can comprise a user interface 1404 which is held by means of the frame 1402. The user interface 1404 can be coupled, for example, to a first hinge of the two hinges 1304 such that it is mounted rotatably relative to the support structure 1306. The frame 1402 can moreover comprise a stand base 1308. The stand base 1308 can be coupled to a second hinge of the two hinges 1304 such that it is mounted rotatably relative to the support structure 1306.

This ensures that the user interface can be displaced and/or rotated relative to the stand base 1308.

Each cable 602 housed in the cable guide 1302 can be coupled to the user interface 1404, for example in order to exchange an electrical signal with the user interface 1404.

The user interface 1404 can comprise, for example, a display device (for example, a touchscreen) and/or a keyboard, and optionally a printer and/or a hard disk. For example, the user interface 1404 can comprise a monitor, for example a PC monitor.

Figure 16:
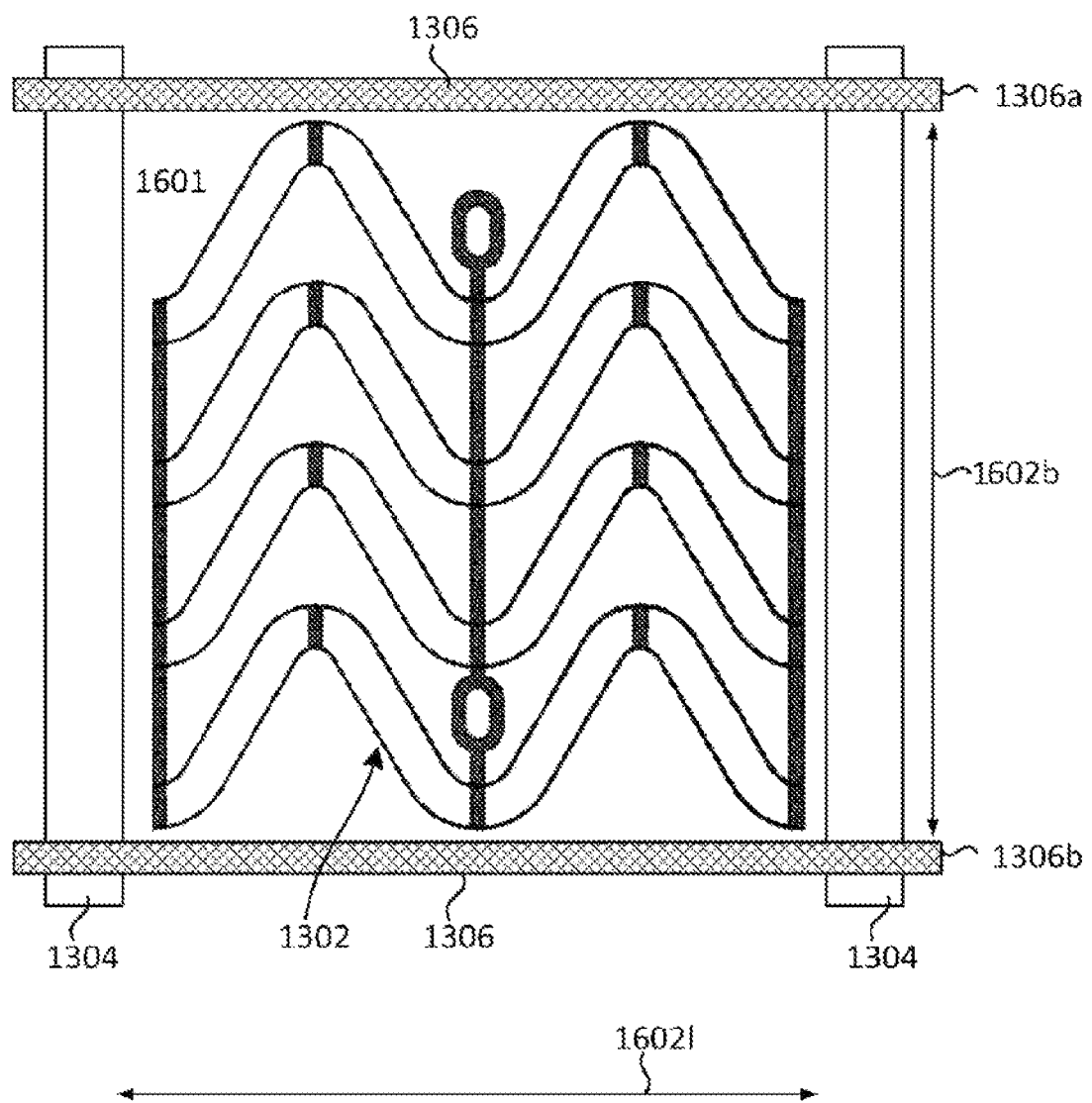

FIG. 16 illustrates some of the components of the device 1400 in a schematic plan view (for example, a view directed at an upper side of the cable guide 1302), with the distinction that the cable guide 1302 is arranged inside the support structure 1306. FIG. 17 illustrates some of the components of the device 1400 in a schematic view in cross-section (for example, a view directed from the amplitude direction 105).

The support structure 1306 can comprise a cavity 1601 (also referred to as the support interior 1601) which is arranged, for example, between two sections 1306a, 1306b of the support structure 1306 (also referred to as the support). Each of the supports 1306a, 1306b can comprise, for example, a web or be formed therefrom, for example a rod. The supports 1306a, 1306b can delimit the support interior 1601 on opposite sides (for example, with respect to the amplitude direction 105).

The support interior 1601 can moreover be arranged between the two hinges 1304, for example be delimited by the latter on opposite sides (for example, with respect to the compensation direction 101).

The cable guide 1302 can be arranged in the support interior 1601. This is a particularly space-saving configuration.

The height 204h of each guide duct 104 (for example, each duct interior 104i) can, for example, be more than approximately 50% of the height 1602h of the support structure 1306 (for example, the support interior 1601 thereof), for example more than approximately 60%, for example more than approximately 70%, for example more than approximately 80%, for example more than approximately 90%. The length 104l of each guide duct 104 can, for example, be more than approximately 50% of a length 1602l of the support interior 1601, for example more than approximately 60%, for example more than approximately 70%, for example more than approximately 80%, for example more than approximately 90%. The length 1602l of the support interior 1601 can be, for example, the same as the spacing of the two hinges 1304 from each other. A width of the cable guide 1302 (extent in the amplitude direction 105) can, for example, be more than approximately 50% of a width 1602b of the support interior 1601 (extent in the amplitude direction 105), for example more than approximately 60%, for example more than approximately 70%, for example more than approximately 80%, for example more than approximately 90%. The width 1602b of the support interior 1601 can be, for example, the same as the spacing of the two supports 1306a, 1306b from each other.

Figure 18:
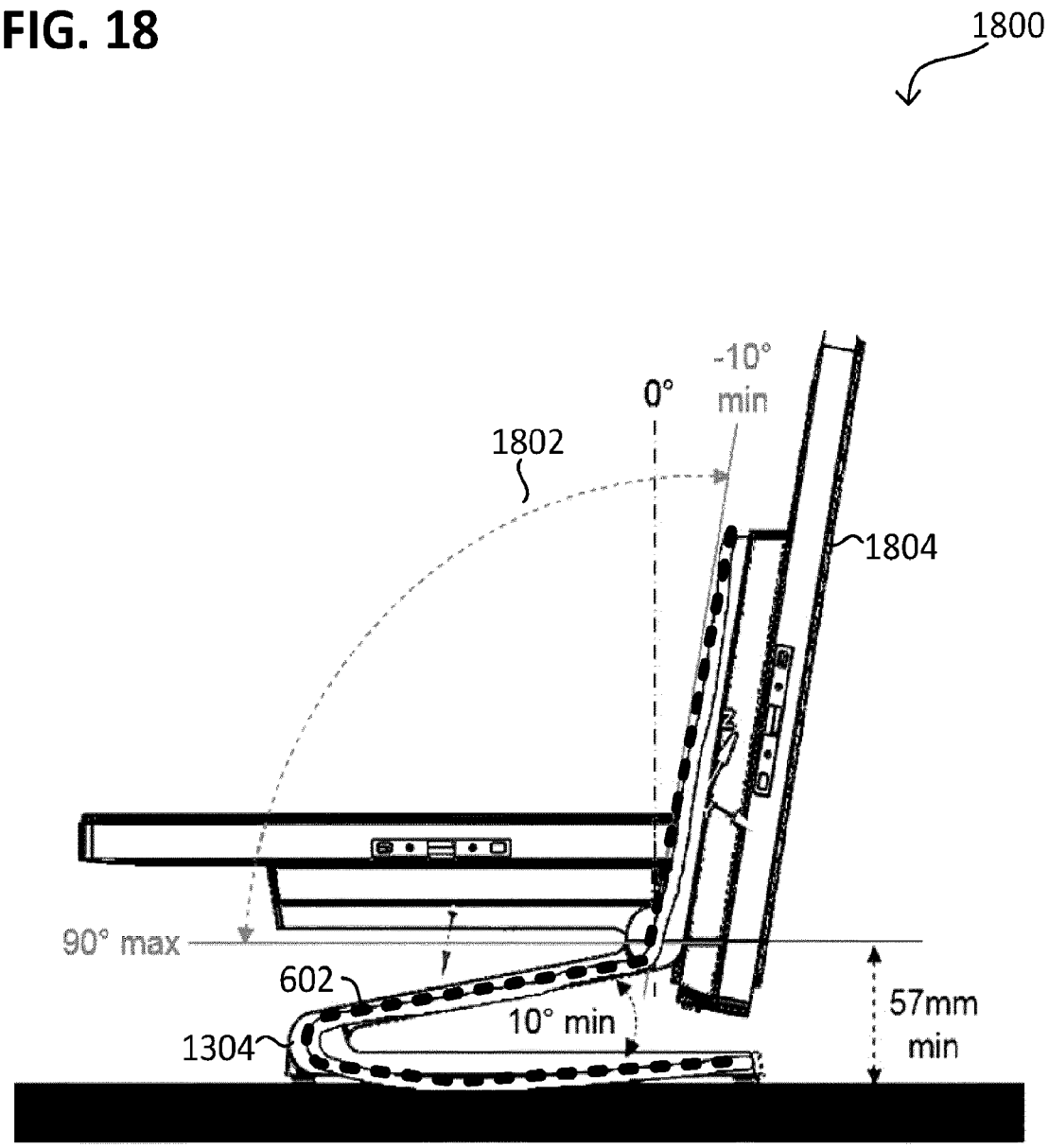

FIG. 18 illustrates a device 1800 according to different embodiments in a schematic plan view (for example, a view directed in the amplitude direction 105) which can be configured in the manner of the device 1400, wherein an angle of rotation 1802 of the hinges 1304 is illustrated. The angle of rotation 1802 can be, for example, in a range from approximately 10° to approximately 130°, for example more than 90°. The user interface of the device 1800 can be part of an all-in-one computer 1804 which is coupled, for example, to one of the hinges 1304. The routing of the cable 602 is moreover illustrated.

Each of the duct segments described herein and/or each of the guide ducts described herein can be duct-shaped, for example two side walls, and preferably be hollow or recessed between the latter (for example, providing the interior) in order to house a cable. A duct-shaped body or duct-shaped segment can, for example, comprise two side walls and preferably be hollow or recessed between the latter (for example, providing the interior) in order to house a cable. A plurality of guide ducts can be arranged next to one another (for example, spaced apart from one another in an amplitude direction and/or transversely to the compensation direction) and their duct segments can be arranged behind one another (for example, spaced apart from one another or coupled to one another in the compensation direction). The fastening structure can extend, for example, in the amplitude direction and/or transversely to the compensation direction in order to couple the plurality of guide ducts to one another.

The fastening structure can, for example, comprise one or more than one first coupling section, each first coupling section of which in each case couples two guide ducts of the plurality of guide ducts to each other, wherein the two guide ducts of the plurality of guide ducts are preferably arranged on opposite sides of the first coupling section. The fastening structure can comprise, for example, a plurality of second coupling sections, each coupling section of which is associated with precisely one guide duct of the plurality of guide ducts and can be arranged between the two duct segments of the associated guide duct and/or can couple them to each other.

Different examples, which relate to the above description and what is illustrated in the drawings, are described below.

Example 1 comprises a cable guide: a fastening structure, a plurality of guide ducts, arranged next to one another, which are coupled to one another by means of the fastening structure and each guide duct of which comprises two serpentine curve-shaped duct segments (for example, duct-shaped segments of the guide duct which are arranged, for example behind one another, for example arranged behind one another in the compensation direction) between which the fastening structure is arranged, wherein the two serpentine curve-shaped duct segments are configured resiliently (for example, deformably) in such a way that they can be compressed toward the fastening structure and expanded away from the fastening structure counter to a spring force.

Example 2 is the cable guide according to Example 1, wherein the two serpentine curve-shaped duct segments extend away from the fastening structure in opposite directions and/or are arranged on opposite sides of the fastening structure.

Example 3 is the cable guide according to Example 1 or 2, wherein each of the two serpentine curve-shaped duct segments comprises a polymer, for example an elastomer, and/or is pierced by a cavity of the guide duct (for example, its interior), wherein, for example, each of the two serpentine-shaped duct segments comprises a segment of the cavity which, for example, pierces the guide duct.

Example 4 is the cable guide according to one of Examples 1 to 3, wherein each of the serpentine curve-shaped duct segments has a spacing (also referred to as the amplitude direction) in one direction from a line which intersects the two end sections of the guide duct, wherein the amplitude direction of each of the guide ducts is parallel to each other (or at least lies in a common plane) and/or is transverse to a direction of the compression or expansion (also referred to as the compensation direction).

Example 5 is the cable guide according to one of Examples 1 to 4, wherein the guide duct and/or each of the two serpentine curve-shaped duct segments has a V-shape or a U-shape, wherein the V-shape or the U-shape at least partially surrounds, for example, a cavity of the guide duct (for example, its interior).

Example 6 is the cable guide according to one of Examples 1 to 5, wherein the serpentine curve-shaped courses of the two duct segments of each guide duct of the plurality of guide ducts are a continuation of each other, for example in a serpentine curve-shaped path, and/or wherein a cavity which passes through the two duct segments of each guide duct (for example, its interior) of the plurality of guide ducts is serpentine, for example extends along the serpentine curve-shaped path.

Example 7 is the cable guide according to one of Examples 1 to 6, wherein each of the two serpentine curve-shaped duct segments comprises two side walls (between which, for example, the interior is arranged) and preferably one or more than one web which couples two side walls of the guide duct to each other.

Example 8 is the cable guide according to one of Examples 1 to 7, wherein two guide ducts, immediately adjacent to each other, of the plurality of guide ducts overlap each other, preferably in such a way that a first one of the two immediately adjacent guide ducts (for example, each duct segment of the two duct segments thereof) comprises a first section (for example, a section which extends in an arched an/or angled manner), and a second one of the two immediately adjacent guide ducts (for example, each duct segment of the two duct segments thereof) comprises two second sections, wherein the two second sections are arranged on opposite sides of the first section.

Example 9 is the cable guide according to one of Examples 1 to 8, wherein the fastening structure comprises one or more than one web which couples immediately adjacent guide ducts to one another.

Example 10 is the cable guide according to one of Examples 1 to 9, wherein two immediately adjacent guide ducts have a spacing from each other in a direction which is smaller than an extent of each of the two guide ducts in the direction.

Example 11 is the cable guide according to one of Examples 1 to 10, wherein the plurality of guide ducts arranged next to one another comprise more than two (for example, more than three) guide ducts.

Example 12 is the cable guide according to one of Examples 1 to 11, wherein each of the two serpentine curve-shaped duct segments comprises an end section which is situated opposite the fastening structure, wherein a first spacing of the end sections in an expanded state of the two serpentine curve-shaped duct segments is more than 1.5 times a second spacing of the end sections in a compressed state of the two serpentine curve-shaped duct segments.

Example 13 is the cable guide according to one of Examples 1 to 12, wherein each of the two serpentine curve-shaped duct segments comprises an end section which is situated opposite the fastening structure, wherein immediately adjacent end sections are coupled to one another, for example by means of a web.

Example 14 is the cable guide according to one of Examples 1 to 13, wherein the fastening structure comprises a plurality of through openings (for example, provided by means of rings) to which it can be fastened.

Example 15 is the cable guide according to one of Examples 1 to 14, wherein each of the plurality of cable ducts is configured monolithically (i.e. as a single piece) or at least so that it is substance-to-substance bonded; and/or wherein the fastening structure and the plurality of cable ducts are configured monolithically (i.e. as a single piece) or at least so that they are substance-to-substance bonded; and/or wherein the cable guide is configured monolithically (i.e. as a single piece) or at least so that it is substance-to-substance bonded.

Example 16 is the cable guide according to one of Examples 1 to 15, wherein each guide duct of the plurality of guide ducts comprises two side walls, between which one or more cavity (for example, interior) is formed for the purpose of housing a cable, wherein the cavity follows the serpentine curve-shaped course of the two duct segments.

Example 17 is the cable guide according to one of Examples 1 to 16, wherein the cable guide has no mechanical joint (at which, for example, two surfaces slide or roll over each other).

Example 18 is the cable guide according to one of Examples 1 to 17, wherein a sinuosity of each guide duct or of each of the two duct segments is greater than 10% (for example, greater than 20%, for example, greater than 30%, for example, greater than 40%).

Example 19 is a device comprising two pivot joints (for example, hinges) and a support structure which couples the two pivot joints (for example, hinges) to each other, a cable guide according to one of Examples 1 to 18 which is arranged between the two pivot joints and is fastened to the support structure with its fastening structure; wherein the cable guide is configured in such a way that each of the two duct segments extend away from the fastening structure to one of the two pivot joints, wherein, for example, each of the pivot joints comprises a hinge or is formed therefrom.

Example 20 is the device according to Example 19, moreover comprising: a user interface which is coupled to one of the two pivot joints; and/or wherein an extent of the two pivot joints transverse to its axis of rotation is smaller than a sinuosity of each guide duct of the cable guide.

Example 21 is a method comprising: fastening a cable guide according to one of claims 1 to 18 to a support structure which couples two pivot joints (for example, hinges) to each other; inserting a plurality of cables into the guide ducts of the cable guide, wherein the plurality of cables are laid about each of the two pivot joints (for example, hinges), wherein, for example, at least one of the plurality of cables is arranged between two immediately adjacent guide ducts, wherein, for example, at least one of the plurality of cables is arranged in one of the plurality of guide ducts.

Example 22 is the method according to Example 21, moreover comprising: rotating each of the two pivot joints (for example, by at least 45°) such that the cable guide is expanded and/or compressed on both sides of the fastening structure.

The invention claimed is:

1. A cable guide comprising: a fastening structure; a plurality of guide ducts which are arranged next to one another and coupled together by the fastening structure and of which each of the plurality of guide ducts has two or more serpentine arc-shaped duct segments, wherein the fastening structure is arranged between two of the serpentine arc-shaped duct segments of the plurality of guide ducts; and wherein each of the serpentine arc-shaped duct segments of the plurality of guide ducts are resilient such that it can be compressed, counter to a spring force, towards the fastening structure and stretched away from the fastening structure wherein each of the serpentine arc-shaped duct segments of the plurality of guide ducts has an end portion located opposite the fastening structure, wherein a first spacing between respective end portions of first and second adjacent serpentine arc-shaped duct segments in a stretched state of the first and second adjacent serpentine arc-shaped duct segments is more than 1.5 times a second spacing of the respective end portions in a compressed state of the first and second adjacent serpentine arc-shaped duct segments.

2. The cable guide of claim 1 wherein each of the serpentine arc-shaped duct segments comprises a polymer.

3. The cable guide according to claim 1 wherein each of the serpentine arc-shaped duct segments is U-shaped.

4. The cable guide of claim 1 wherein two of the serpentine arc-shaped duct segments each of the plurality of guide ducts are a continuation of one another.

5. The cable guide of claim 1 wherein two of the plurality of guide ducts are directly adjacent to each other and overlap each other.

6. The cable guide of claim 1 wherein the plurality of guide ducts is further defined as more than two guide ducts.

7. The cable guide of claim 1 wherein the fastening structure has a plurality of through-openings.

8. The cable guide of claim 1 wherein a sinuosity of each of the serpentine arc-shaped duct segments is greater than 20%.

9. A device comprising: two pivot joints and a carrier structure that couples the two pivot joints together; the cable guide according to claim 1, which is arranged between the two pivot joints and is fastened to the support structure by the fastening structure; and wherein the cable guide is oriented such that each of the serpentine arc-shaped duct segments extends away from the fastening structure to one of the two pivot joints.

10. A method comprising: fastening a cable guide according to claim 1 to a support structure the couples two pivot joints with each other; and introducing a plurality of cables into the plurality of guide ducts of the cable guide wherein the plurality of cables are laid about each of the two pivot joints.

* * * * *